US012574080B2

(12) United States Patent
Huang et al.

(10) Patent No.: US 12,574,080 B2
(45) Date of Patent: Mar. 10, 2026

(54) PRECODING WEIGHT CALCULATION METHOD AND RELATED APPARATUS

(71) Applicant: HUAWEI TECHNOLOGIES CO., LTD., Shenzhen (CN)

(72) Inventors: Jie Huang, Shanghai (CN); Leting Li, Shanghai (CN); Liechen Li, Bangkok (TH); Guankai Zhao, Shanghai (CN); Yuanchao Li, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 88 days.

(21) Appl. No.: 18/505,211

(22) Filed: Nov. 9, 2023

(65) Prior Publication Data

US 2024/0072856 A1     Feb. 29, 2024

Related U.S. Application Data

(63) Continuation of application No. PCT/CN2022/093001, filed on May 16, 2022.

(30) Foreign Application Priority Data

Jun. 25, 2021     (CN) .......................... 202110712003.8

(51) Int. Cl.
*H04W 72/23*     (2023.01)
*H04B 7/0456*     (2017.01)

(52) U.S. Cl.
CPC .................................. *H04B 7/0456* (2013.01)

(58) Field of Classification Search
CPC ..... H04W 72/23; H04W 24/10; H04W 72/21; H04W 72/0446; H04W 16/28;

(Continued)

(56) References Cited

U.S. PATENT DOCUMENTS 10,038,527 B2 *   7/2018   Li .......................... H04W 72/23
10,142,082 B1 *   11/2018   Shattil ............... H04L 27/26134
(Continued)

FOREIGN PATENT DOCUMENTS

CN       101207600 A      6/2008
CN       104104625 A      10/2014

OTHER PUBLICATIONS

Extended European Search Report issued in corresponding European Application No. 22827241.5, dated Sep. 20, 2024, pp. 1-12.

*Primary Examiner* — Eva Y Puente
(74) *Attorney, Agent, or Firm* — HAUPTMAN HAM, LLP

(57)     ABSTRACT

A precoding weight calculation method and a related apparatus to provide improved communication quality. First channel estimation values and a plurality of second channel estimation values are obtained based on a resource block group. A first equalization coefficient is obtained based on the first channel estimation values. A second equalization coefficient is obtained based on the second channel estimation values. A plurality of first equivalent channel coefficients are obtained based on the first equalization coefficient. A plurality of second equivalent channel coefficients are obtained based on the second equalization coefficient. A first precoding weight and a second precoding weight are obtained based on the plurality of first equivalent channel coefficients and the plurality of second equivalent channel coefficients.

15 Claims, 11 Drawing Sheets

(58) Field of Classification Search
CPC . H04W 72/04; H04W 72/0453; H04W 24/08;
H04L 5/0048; H04L 5/0053; H04L
5/0023; H04L 5/0051; H04L 5/0094;
H04L 5/0007; H04L 5/001; H04L 5/005;
H04B 7/0456; H04B 7/0626; H04B
7/0639; H04B 7/0617; H04B 7/0452;
H04B 7/0417; H04B 7/024; H04B 7/0413
See application file for complete search history.

(56) References Cited

U.S. PATENT DOCUMENTS

| | | | |
|---|---|---|---|
| 2017/0373885 | A1 | 12/2017 | Panah et al. |
| 2018/0227037 | A1* | 8/2018 | Ahmed Ouameur ........................ H04B 7/0854 |
| 2018/0337714 | A1* | 11/2018 | Kuchi ................. H04L 27/2636 |
| 2019/0103949 | A1* | 4/2019 | Harrison ............. H04B 7/0456 |
| 2022/0200669 | A1* | 6/2022 | Banuli Nanje Gowda ................... G06F 9/466 |

* cited by examiner

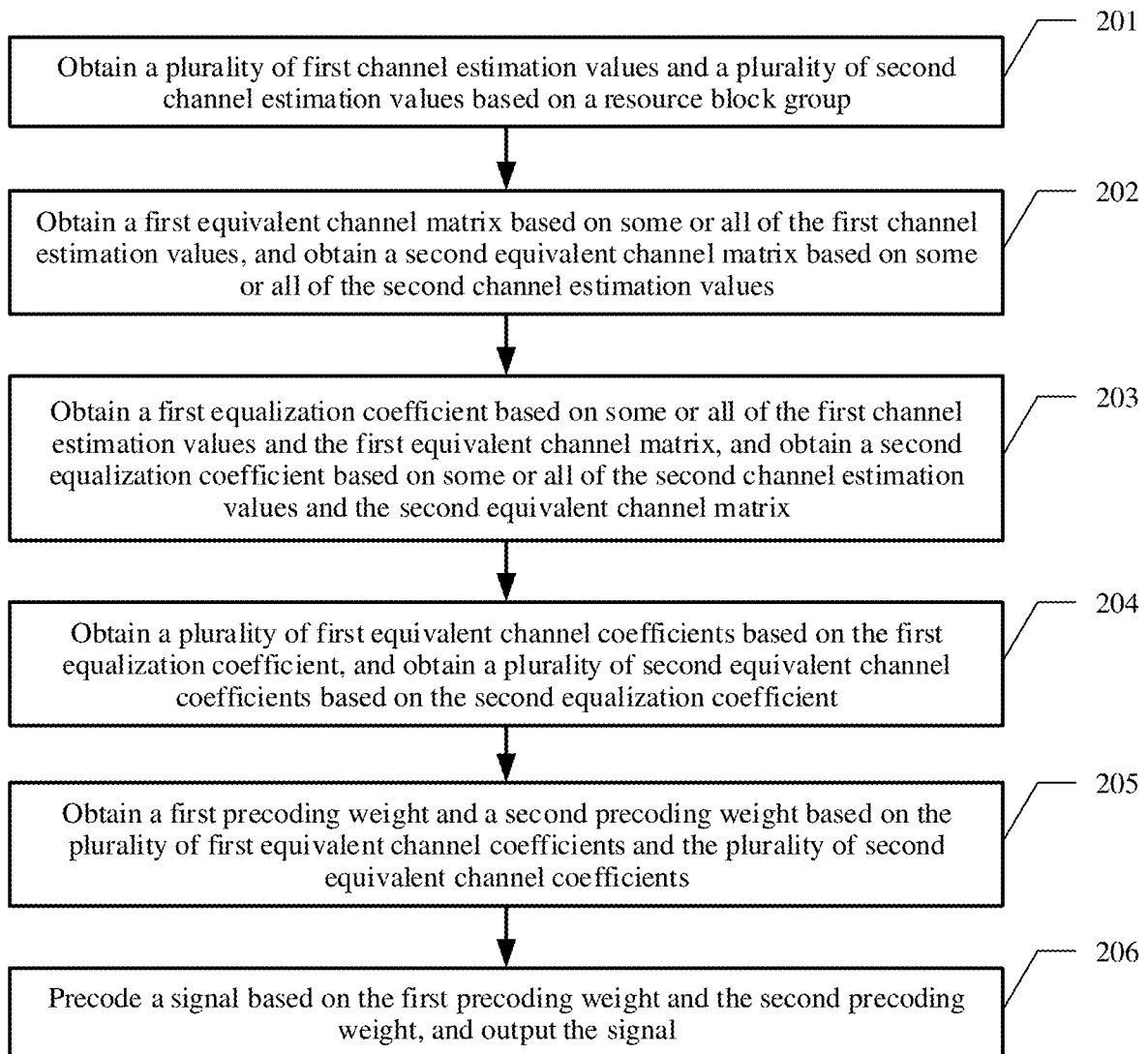

Obtain a plurality of first channel estimation values and a plurality of second channel estimation values based on a resource block group
201

Obtain a first equivalent channel matrix based on some or all of the first channel estimation values, and obtain a second equivalent channel matrix based on some or all of the second channel estimation values
202

Obtain a first equalization coefficient based on some or all of the first channel estimation values and the first equivalent channel matrix, and obtain a second equalization coefficient based on some or all of the second channel estimation values and the second equivalent channel matrix
203

Obtain a plurality of first equivalent channel coefficients based on the first equalization coefficient, and obtain a plurality of second equivalent channel coefficients based on the second equalization coefficient
204

Obtain a first precoding weight and a second precoding weight based on the plurality of first equivalent channel coefficients and the plurality of second equivalent channel coefficients
205

Precode a signal based on the first precoding weight and the second precoding weight, and output the signal
206

FIG. 2

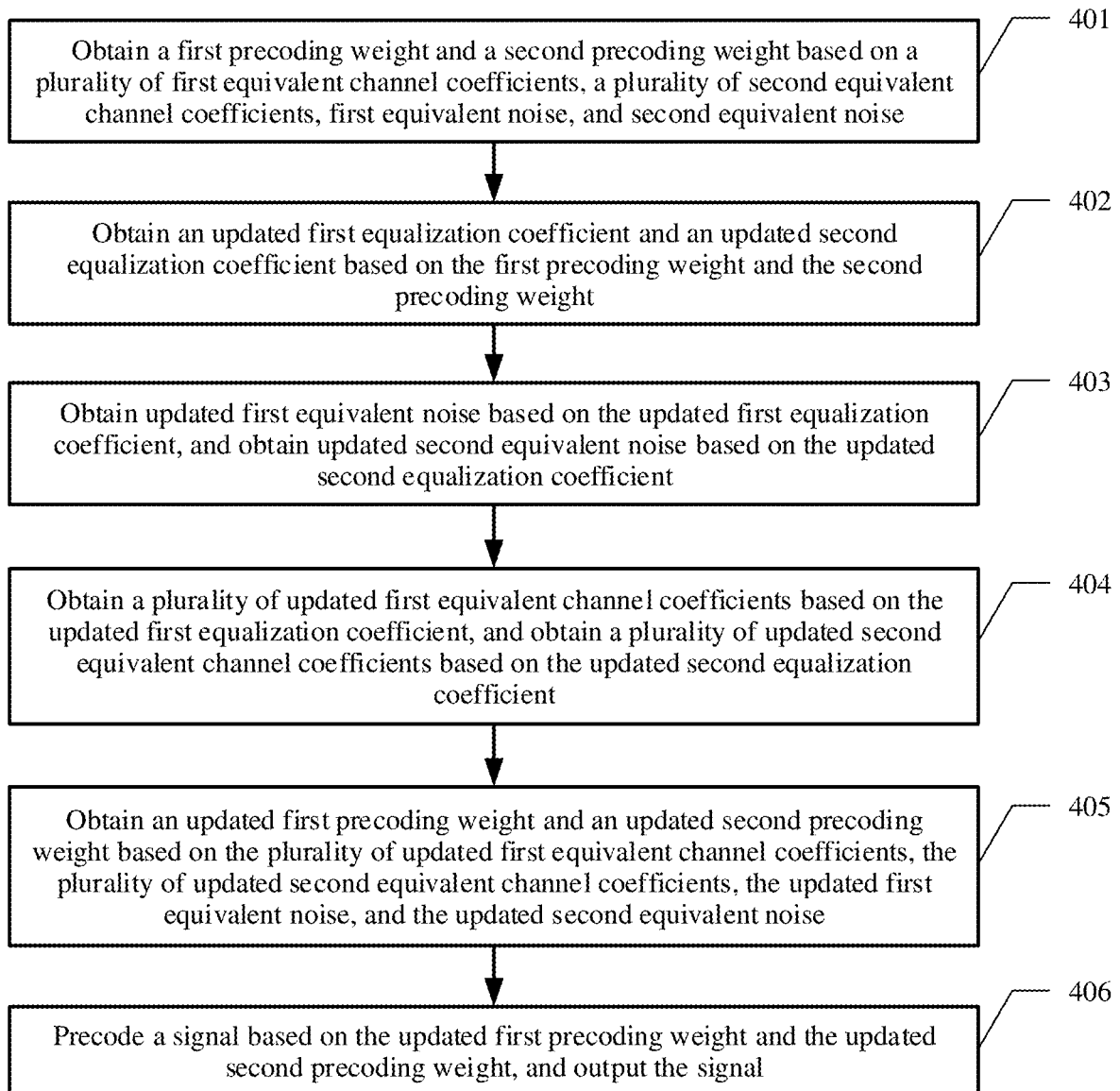

Obtain a first precoding weight and a second precoding weight based on a plurality of first equivalent channel coefficients, a plurality of second equivalent channel coefficients, first equivalent noise, and second equivalent noise    ⎯ 401

Obtain an updated first equalization coefficient and an updated second equalization coefficient based on the first precoding weight and the second precoding weight    ⎯ 402

Obtain updated first equivalent noise based on the updated first equalization coefficient, and obtain updated second equivalent noise based on the updated second equalization coefficient    ⎯ 403

Obtain a plurality of updated first equivalent channel coefficients based on the updated first equalization coefficient, and obtain a plurality of updated second equivalent channel coefficients based on the updated second equalization coefficient    ⎯ 404

Obtain an updated first precoding weight and an updated second precoding weight based on the plurality of updated first equivalent channel coefficients, the plurality of updated second equivalent channel coefficients, the updated first equivalent noise, and the updated second equivalent noise    ⎯ 405

Precode a signal based on the updated first precoding weight and the updated second precoding weight, and output the signal    ⎯ 406

FIG. 4

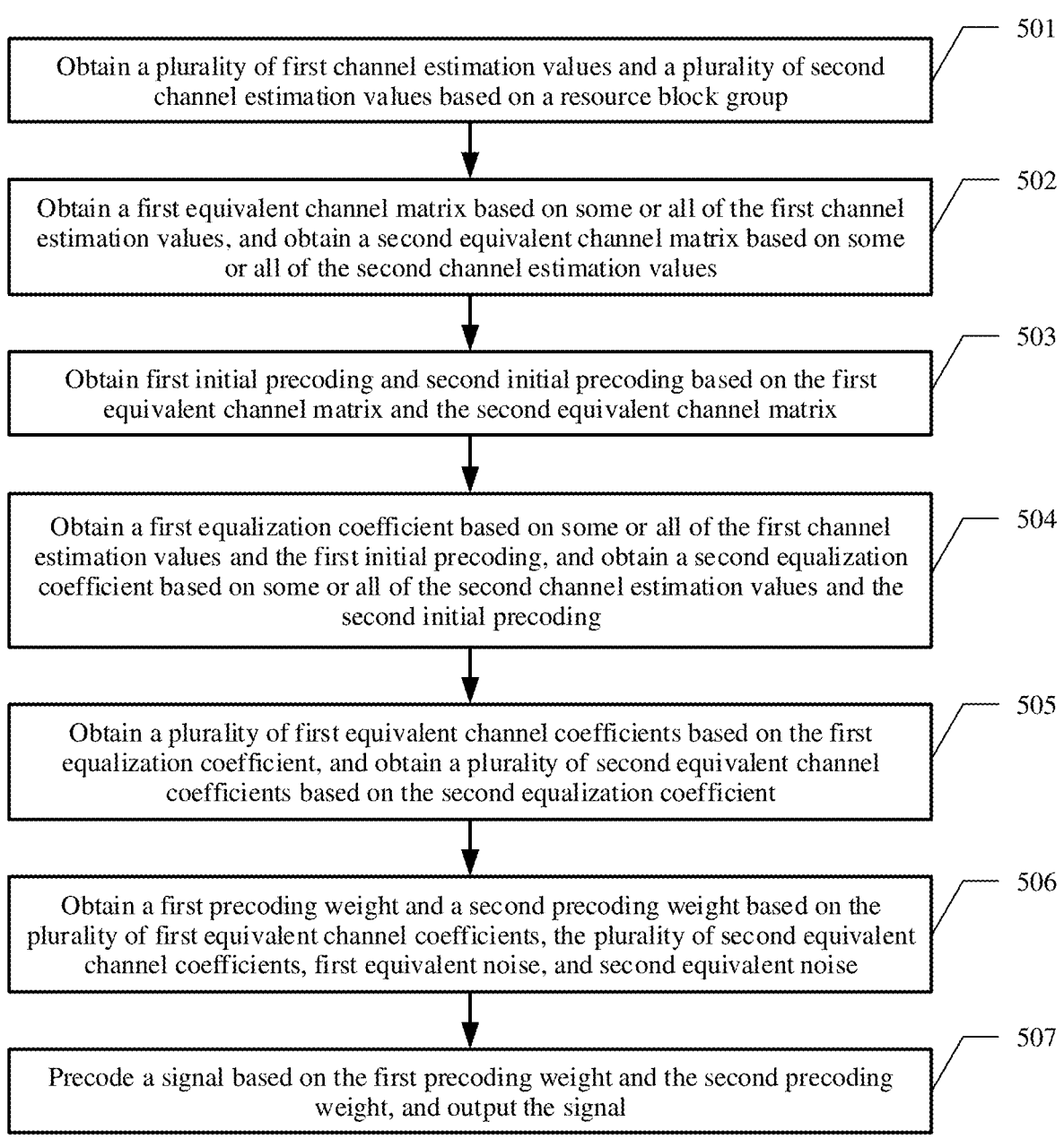

Obtain a plurality of first channel estimation values and a plurality of second channel estimation values based on a resource block group — 501

Obtain a first equivalent channel matrix based on some or all of the first channel estimation values, and obtain a second equivalent channel matrix based on some or all of the second channel estimation values — 502

Obtain first initial precoding and second initial precoding based on the first equivalent channel matrix and the second equivalent channel matrix — 503

Obtain a first equalization coefficient based on some or all of the first channel estimation values and the first initial precoding, and obtain a second equalization coefficient based on some or all of the second channel estimation values and the second initial precoding — 504

Obtain a plurality of first equivalent channel coefficients based on the first equalization coefficient, and obtain a plurality of second equivalent channel coefficients based on the second equalization coefficient — 505

Obtain a first precoding weight and a second precoding weight based on the plurality of first equivalent channel coefficients, the plurality of second equivalent channel coefficients, first equivalent noise, and second equivalent noise — 506

Precode a signal based on the first precoding weight and the second precoding weight, and output the signal — 507

FIG. 5

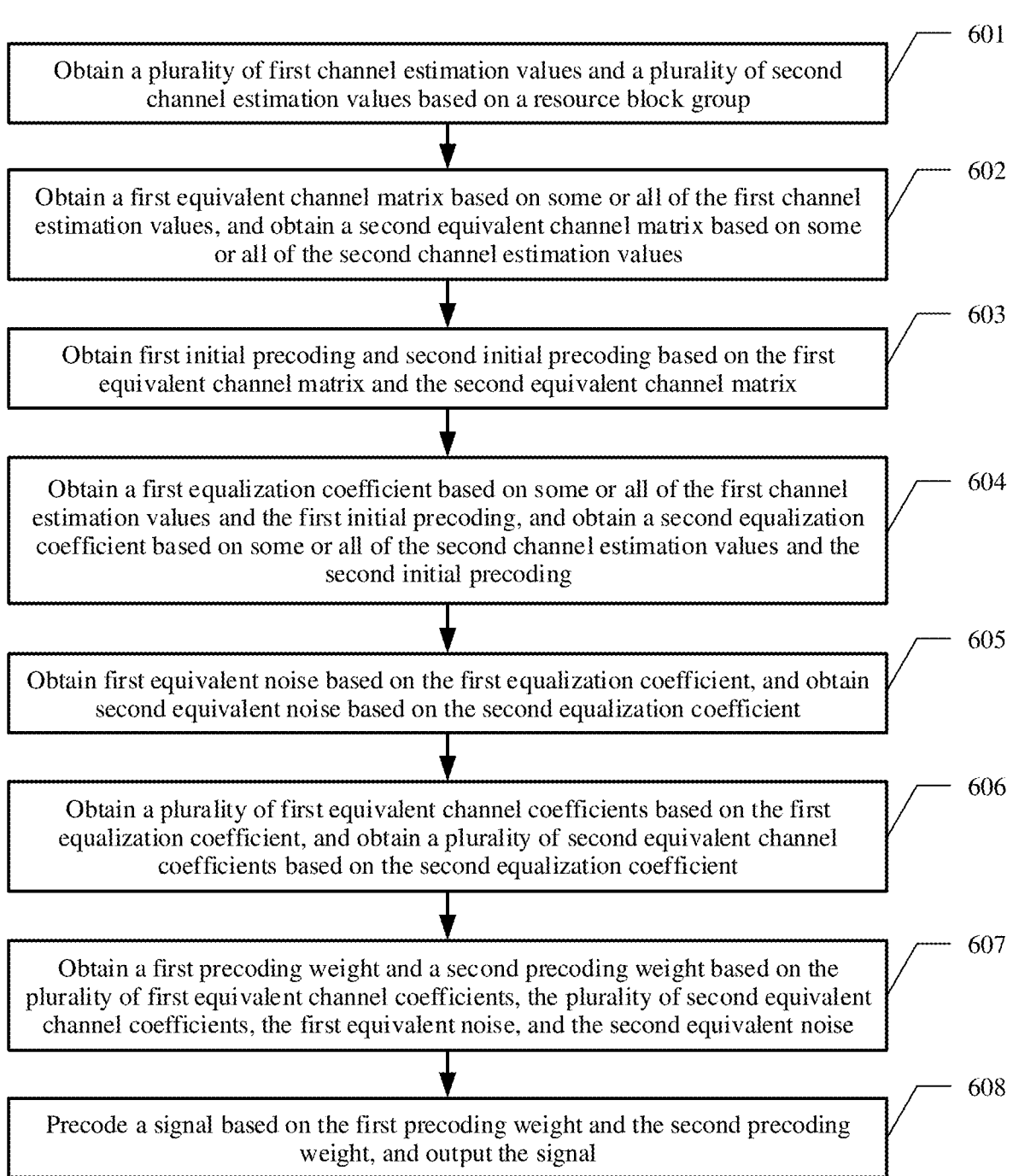

Obtain a plurality of first channel estimation values and a plurality of second channel estimation values based on a resource block group ⟋— 601

Obtain a first equivalent channel matrix based on some or all of the first channel estimation values, and obtain a second equivalent channel matrix based on some or all of the second channel estimation values ⟋— 602

Obtain first initial precoding and second initial precoding based on the first equivalent channel matrix and the second equivalent channel matrix ⟋— 603

Obtain a first equalization coefficient based on some or all of the first channel estimation values and the first initial precoding, and obtain a second equalization coefficient based on some or all of the second channel estimation values and the second initial precoding ⟋— 604

Obtain first equivalent noise based on the first equalization coefficient, and obtain second equivalent noise based on the second equalization coefficient ⟋— 605

Obtain a plurality of first equivalent channel coefficients based on the first equalization coefficient, and obtain a plurality of second equivalent channel coefficients based on the second equalization coefficient ⟋— 606

Obtain a first precoding weight and a second precoding weight based on the plurality of first equivalent channel coefficients, the plurality of second equivalent channel coefficients, the first equivalent noise, and the second equivalent noise ⟋— 607

Precode a signal based on the first precoding weight and the second precoding weight, and output the signal ⟋— 608

FIG. 6

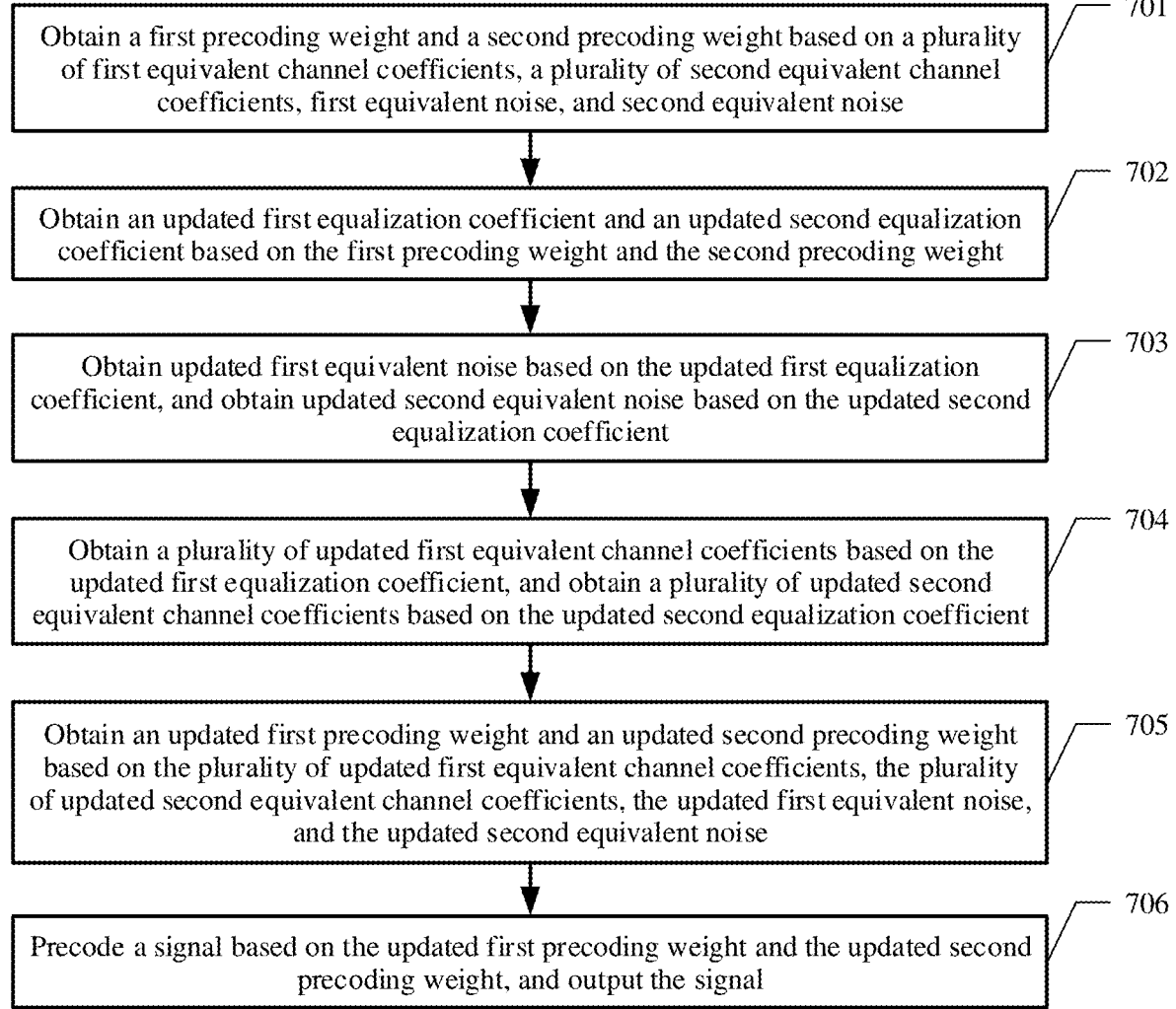

Obtain a first precoding weight and a second precoding weight based on a plurality of first equivalent channel coefficients, a plurality of second equivalent channel coefficients, first equivalent noise, and second equivalent noise — 701

Obtain an updated first equalization coefficient and an updated second equalization coefficient based on the first precoding weight and the second precoding weight — 702

Obtain updated first equivalent noise based on the updated first equalization coefficient, and obtain updated second equivalent noise based on the updated second equalization coefficient — 703

Obtain a plurality of updated first equivalent channel coefficients based on the updated first equalization coefficient, and obtain a plurality of updated second equivalent channel coefficients based on the updated second equalization coefficient — 704

Obtain an updated first precoding weight and an updated second precoding weight based on the plurality of updated first equivalent channel coefficients, the plurality of updated second equivalent channel coefficients, the updated first equivalent noise, and the updated second equivalent noise — 705

Precode a signal based on the updated first precoding weight and the updated second precoding weight, and output the signal — 706

FIG. 7

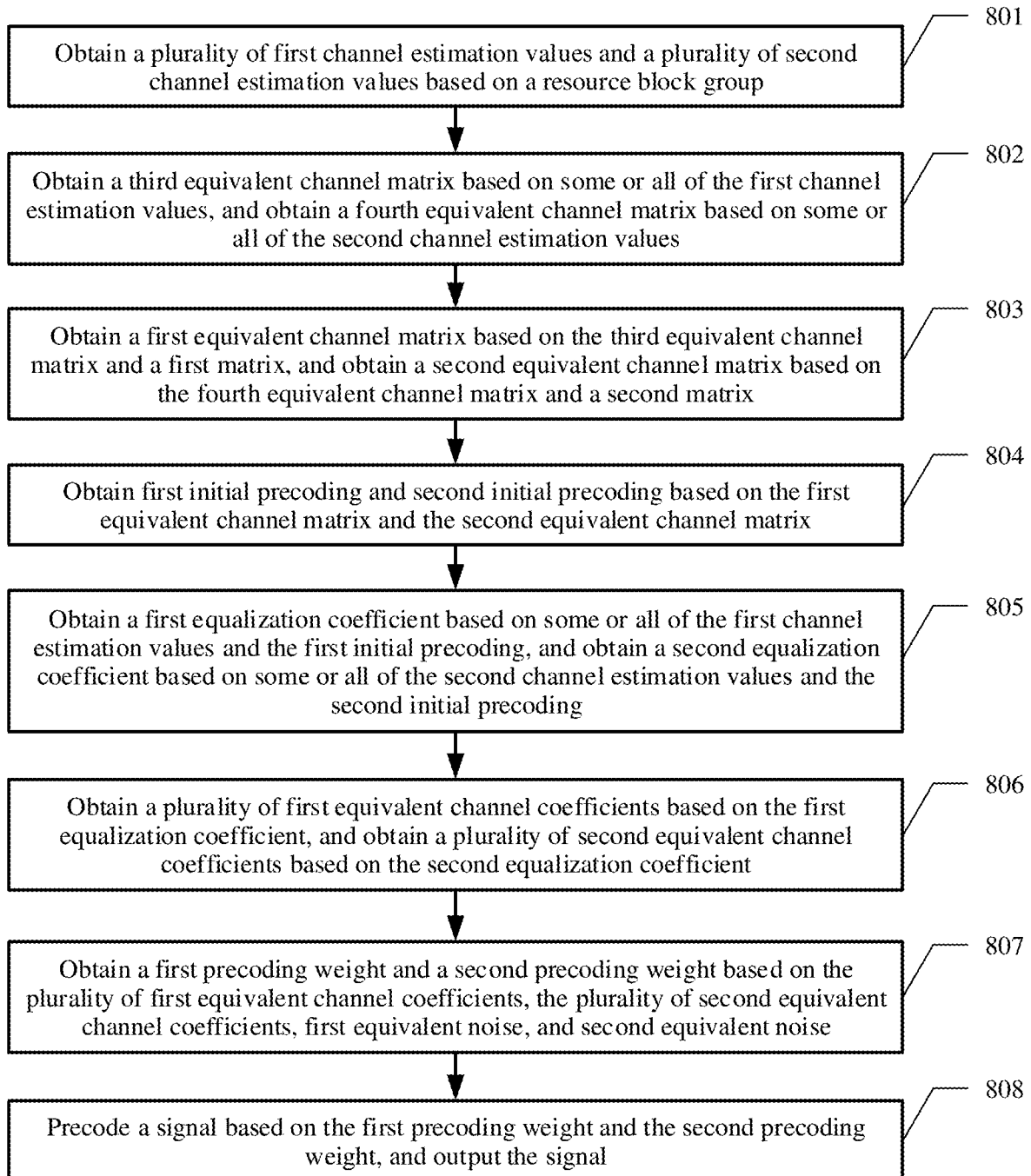

Obtain a plurality of first channel estimation values and a plurality of second channel estimation values based on a resource block group — 801

Obtain a third equivalent channel matrix based on some or all of the first channel estimation values, and obtain a fourth equivalent channel matrix based on some or all of the second channel estimation values — 802

Obtain a first equivalent channel matrix based on the third equivalent channel matrix and a first matrix, and obtain a second equivalent channel matrix based on the fourth equivalent channel matrix and a second matrix — 803

Obtain first initial precoding and second initial precoding based on the first equivalent channel matrix and the second equivalent channel matrix — 804

Obtain a first equalization coefficient based on some or all of the first channel estimation values and the first initial precoding, and obtain a second equalization coefficient based on some or all of the second channel estimation values and the second initial precoding — 805

Obtain a plurality of first equivalent channel coefficients based on the first equalization coefficient, and obtain a plurality of second equivalent channel coefficients based on the second equalization coefficient — 806

Obtain a first precoding weight and a second precoding weight based on the plurality of first equivalent channel coefficients, the plurality of second equivalent channel coefficients, first equivalent noise, and second equivalent noise — 807

Precode a signal based on the first precoding weight and the second precoding weight, and output the signal — 808

FIG. 8

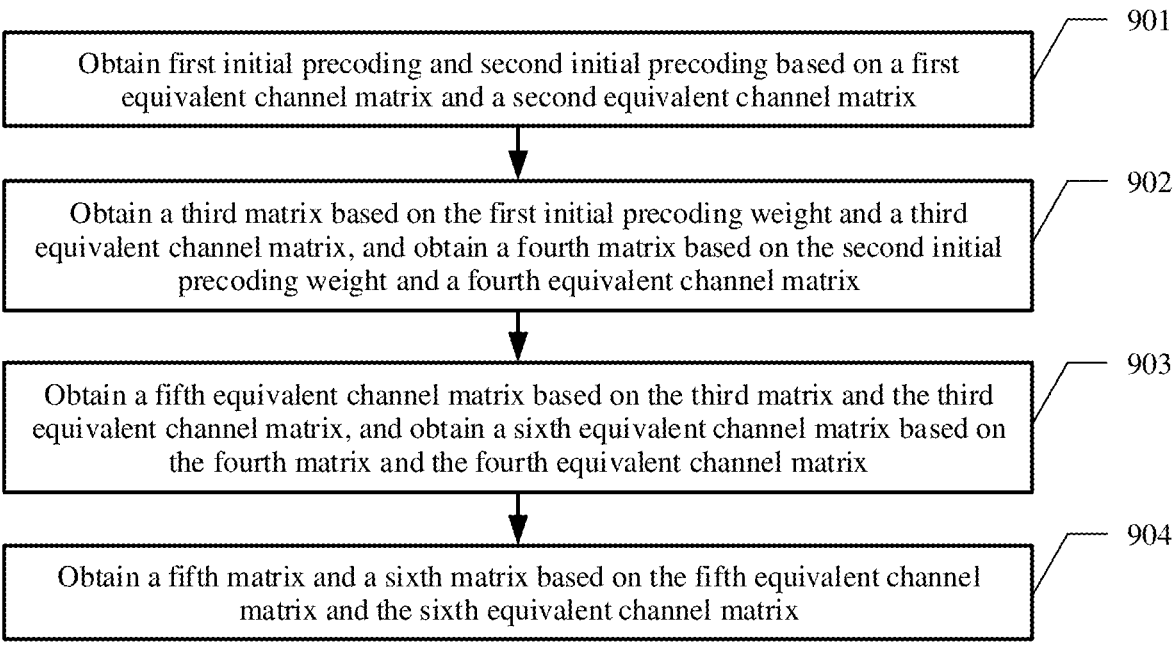

901

Obtain first initial precoding and second initial precoding based on a first equivalent channel matrix and a second equivalent channel matrix

902

Obtain a third matrix based on the first initial precoding weight and a third equivalent channel matrix, and obtain a fourth matrix based on the second initial precoding weight and a fourth equivalent channel matrix

903

Obtain a fifth equivalent channel matrix based on the third matrix and the third equivalent channel matrix, and obtain a sixth equivalent channel matrix based on the fourth matrix and the fourth equivalent channel matrix

904

Obtain a fifth matrix and a sixth matrix based on the fifth equivalent channel matrix and the sixth equivalent channel matrix

Interface module

Processing module

FIG. 10

PRECODING WEIGHT CALCULATION METHOD AND RELATED APPARATUS

CROSS-REFERENCE TO RELATED APPLICATIONS

This application is a continuation of International Application No. PCT/CN2022/093001, filed on May 16, 2022, which claims priority to Chinese Patent Application No. 202110712003.8, filed on Jun. 25, 2021. The disclosures of the aforementioned applications are hereby incorporated by reference in their entireties.

BACKGROUND

In a multi-antenna system, a coefficient matrix used by a transmit end to distribute a signal is referred to as a precoding weight. The precoding weight is used to increase a peak transmission rate and increase a throughput.

A base station calculates the precoding weight based on a resource block group (resource block group, RBG). One RBG includes a plurality of subcarriers. The base station calculates a channel estimation value corresponding to each sub carrier, where the channel estimation value indicates a direction of a channel corresponding to a single subcarrier. Then, the base station combines all channel estimation values in one RBG to obtain a combined channel estimation value, where the combined channel estimation value indicates a synthesized direction of channels corresponding to all subcarriers, and obtains the precoding weight based on the combined channel estimation value.

However, the synthesized direction is greatly different from the direction of the channel corresponding to each subcarrier. As a result, large signal interference exists in the precoding weight obtained by using the foregoing method.

SUMMARY

Embodiments described herein provide a precoding weight calculation method and a related apparatus, to reduce interference between downlink signals.

A first aspect of embodiments described herein provide a precoding weight calculation method.

The precoding weight calculation method in at least one embodiment is performed by a base station, or is performed by a processor, a chip, or a chip system disposed in a base station, or is implemented by a logical module or software that implements some or all functions corresponding to the method.

Corresponding first channel estimation values and a plurality of second channel estimation values are obtained based on an RBG, where the plurality of first channel estimation values respectively correspond to a plurality of first subcarriers, the plurality of second channel estimation values respectively correspond to a plurality of second subcarriers, and the plurality of first subcarriers and the plurality of second subcarriers are included in the RBG. A first equalization coefficient is obtained based on some or all of the plurality of first channel estimation values, and a second equalization coefficient is obtained based on some or all of the plurality of second channel estimation values. Then, a plurality of first equivalent channel coefficients are obtained based on the first equalization coefficient, and a plurality of second equivalent channel coefficients are obtained based on the second equalization coefficient. Further, a first precoding weight and a second precoding weight are obtained based on the plurality of first equivalent channel coefficients and the plurality of second equivalent channel coefficients. After the first precoding weight and the second precoding weight are obtained, a signal is precoded based on the first precoding weight and the second precoding weight, and the signal is output.

In at least one embodiment, in response to a precoding weight being obtained, a plurality of equivalent channel coefficients corresponding to one terminal are calculated, and directions of channels corresponding to a plurality of subcarriers are considered. Therefore, in response to a signal being precoded based on the obtained precoding weight, interference between downlink signals is reduced.

In at least one embodiment, there is a one-to-one correspondence between the plurality of first equivalent channel coefficients and the plurality of first channel estimation values, there is a one-to-one correspondence between the plurality of second equivalent channel coefficients and the plurality of second channel estimation values, and the equivalent channel coefficient also indicates a direction of a channel corresponding to a subcarrier.

In at least one embodiment, the RBG includes a plurality of subcarriers, including a plurality of first subcarriers and a plurality of second subcarriers. The plurality of first subcarriers correspond to one terminal, and the plurality of second subcarriers correspond to another terminal.

In at least one embodiment, a first equivalent channel matrix is obtained based on some or all of the plurality of first channel estimation values, and a second equivalent channel matrix is obtained based on some or all of the plurality of second channel estimation values. Then, the first equalization coefficient is obtained based on some or all of the plurality of first channel estimation values and the first equivalent channel matrix, and the second equalization coefficient is obtained based on some or all of the plurality of second channel estimation values and the second equivalent channel matrix.

In at least one embodiment, a first initial precoding weight and a second initial precoding weight is obtained based on the first equivalent channel matrix and the second equivalent channel matrix. Then, the first equalization coefficient is obtained based on some or all of the plurality of first channel estimation values and the first initial precoding weight, and the second equalization coefficient is obtained based on some or all of the plurality of second channel estimation values and the second initial precoding weight.

In at least one embodiment, the equalization coefficient is obtained based on the initial precoding weight, so that the finally obtained precoding weight implements better communication quality.

In at least one embodiment, first, a third equivalent channel matrix is obtained based on some or all of the plurality of first channel estimation values, and a fourth equivalent channel matrix is obtained based on some or all of the plurality of second channel estimation values, where the third equivalent channel matrix is a matrix of $l_1 \times n_1$, $l_1$ represents a quantity of transmit antennas of first data, the fourth equivalent channel matrix is a matrix of $l_2 \times n_2$, $l_2$ represents a quantity of transmit antennas of second data, $n_1$ represents a quantity of receive antennas corresponding to the first data, $n_2$ represents a quantity of receive antennas corresponding to the second data, the first data is used to be sent to one terminal, the second data is used to be sent to another terminal, and the signal includes the first data and the second data. After the third equivalent channel matrix and the fourth equivalent channel matrix are obtained, the first equivalent channel matrix is obtained based on the third equivalent channel matrix and a first matrix $G_1$, and the second equivalent channel matrix is obtained based on the fourth equivalent channel matrix and a second matrix $G_2$, where the first matrix $G_1$ satisfies $$G_1 = \begin{bmatrix} I_1 \\ \hline 0_1 \end{bmatrix},$$

$I_1$ represents an identity matrix of $m_1 \times m_1$, $m_1$ represents a quantity of layers corresponding to the first data, and $0_1$ represents an all-0 matrix of $(n_1-m_1) \times m_1$; and the second matrix $G_2$ satisfies $$G_2 = \begin{bmatrix} I_2 \\ \hline 0_2 \end{bmatrix},$$

$I_2$ represents an identity matrix of $m_2 \times m_2$, $m_2$ represents a quantity of layers corresponding to the second data, and $0_2$ represents an all-0 matrix of $(n_2-m_2) \times m_2$.

In at least one embodiment, a third matrix is further obtained based on the first initial precoding weight and the third equivalent channel matrix, and a fourth matrix is further obtained based on the second initial precoding weight and the fourth equivalent channel matrix. Then, a fifth equivalent channel matrix is obtained based on the third matrix and the third equivalent channel matrix, and a sixth equivalent channel matrix is obtained based on the fourth matrix and the fourth equivalent channel matrix. Further, a fifth matrix and a sixth matrix are obtained based on the fifth equivalent channel matrix and the sixth equivalent channel matrix, the first initial precoding weight is updated to the fifth matrix, and the second initial precoding weight is updated to the sixth matrix.

In at least one embodiment, the initial precoding weight is updated, so that the finally obtained precoding weight implements better communication quality.

In at least one embodiment, first equivalent noise is further obtained based on the first equalization coefficient, and second equivalent noise is further obtained based on the second equalization coefficient. Then, the first precoding weight and the second precoding weight are obtained based on the plurality of first equivalent channel coefficients, the plurality of second equivalent channel coefficients, the first equivalent noise, and the second equivalent noise.

In at least one embodiment, the equivalent noise is further considered in response to the precoding weight being obtained, so that the finally obtained precoding weight implements better communication quality.

A second aspect of at least one embodiment provides a communication apparatus, to implement the method in any one of the first aspect or the implementations of the first aspect. The apparatus includes a corresponding unit or module configured to perform the foregoing method. The unit or module included in the apparatus is implemented by software and/or hardware. For example, the apparatus is a terminal or a radio access network device, or is a chip, a chip system, or a processor that supports a terminal or a network device in implementing the foregoing method, or is a logical module or software that implements all or some functions of a radio access network device.

A third aspect of at least one embodiment provides a communication apparatus, including a processor. The processor is coupled to a memory, and the memory is configured to store instructions. In response to the instructions being executed by the processor, the apparatus is enabled to perform the method in the first aspect.

A fourth aspect of at least one embodiment provides a computer-readable storage medium. The computer-readable storage medium stores a computer program or instructions, and in response to the computer program or the instructions being executed, a computer is enabled to perform the method in the first aspect.

A fifth aspect of at least one embodiment provides a computer program product. The computer program product includes computer program code, and in response to the computer program code being run on a computer, the computer is enabled to implement the method in the first aspect.

BRIEF DESCRIPTION OF DRAWINGS

FIG. 2 to FIG. 9 are schematic diagrams of several procedures of a precoding weight calculation method according to at least one embodiment;

FIG. 10 is a schematic diagram of a structure of a communication apparatus according to at least one embodiment.

DESCRIPTION OF EMBODIMENTS

The following describes at least one embodiment with reference to the accompanying drawings. Apparently, the described embodiments are merely some embodiments. A person of ordinary skill in the art knows that, with development of technologies and emergence of a new scenario, the technical solutions provided in at least one embodiment are also applicable to similar technical problems.

In at least one embodiment, claims, and accompanying drawings, the terms such as "first" and "second" are used to distinguish between similar objects but are unnecessarily used to describe a specific order or sequence. Data termed in such a way are interchangeable in appropriate cases, so that embodiments described herein is implemented in an order other than the order illustrated or described herein. In addition, the terms "include", "have", and any variant thereof are intended to cover non-exclusive inclusion, for example, processes, methods, systems, products, or devices that include a series of steps or units are not necessarily limited to those steps or units that are expressly listed, but includes other steps or units that are not expressly listed or that are inherent to these process, methods, products, or devices.

At least one embodiment provides a precoding weight calculation method and a communication apparatus, to avoid more interference directions, thereby improving communication quality.

In the following, some terms in at least one embodiment are explained and described to facilitate understanding by a person skilled in the art.

Transpose: $A^T$, where for example, $$A = \begin{bmatrix} a11 & a12 & a13 & a14 \\ a21 & a22 & a23 & a24 \\ a31 & a32 & a33 & a34 \\ a41 & a42 & a43 & a44 \end{bmatrix}, \text{and } A^T = \begin{bmatrix} a11 & a21 & a31 & a41 \\ a12 & a22 & a32 & a42 \\ a13 & a23 & a33 & a43 \\ a14 & a24 & a34 & a44 \end{bmatrix}.$$

Conjugate transpose: $A^H$, where for example, $A^H=(\overline{A})^T$, and $\overline{A}$ represents a matrix formed by using a conjugate complex number of an element A as an element.

Figure 1A:
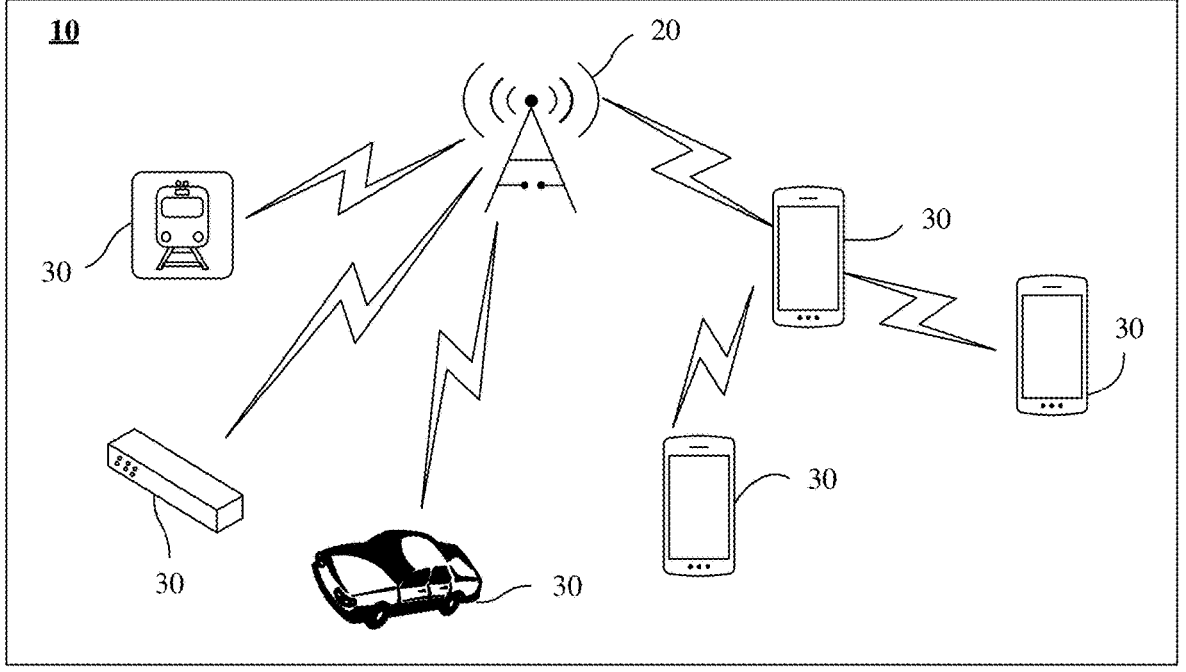
FIG. 1a is a schematic diagram of an application scenario according to at least one embodiment.

The following describes, by using a communication system shown in FIG. 1a as an example, a system architecture to which the method provided in at least one embodiment is applicable. FIG. 1a shows a communication system 10 according to at least one embodiment. The communication system 10 includes at least one communication apparatus 20, and one or more terminal devices 30 connected to the communication apparatus 20. Further, different terminal devices 30 communicates with each other.

The communication apparatus 20 in at least one embodiment is a device for connecting the terminal device 30 to a wireless network, for example, is an evolved NodeB (evolved NodeB, eNB or eNodeB) in LTE, a gNodeB in a 5G network, a 6G network, or a future evolved public land mobile network (public land mobile network, PLMN), a broadband network gateway (broadband network gateway, BNG), an aggregation switch, or a non-3GPP access device. Alternatively, the communication apparatus 20 in at least one embodiment is a radio controller in a cloud radio access network (cloud radio access network, CRAN), a transmission and reception point (transmission and reception point, TRP), a device including a TRP, or the like. This is not specifically limited in at least one embodiment.

In at least one embodiment, the base station in at least one embodiment includes base stations in various forms, for example, a macro base station, a micro base station (which is also referred to as a small cell), a relay station, and an access point. This is not specifically limited in at least one embodiment.

In at least one embodiment, the communication apparatus 20 in at least one embodiment is a central unit (central unit, CU) or a distributed unit (distributed unit, DU), or a network device includes a CU and a DU. A plurality of DUs share one CU, and one DU alternatively is connected to a plurality of CUs. The CU and the DU is understood as division of the network device from a perspective of a logical function. The CU and the DU are physically separated, or are deployed together. This is not specifically limited in at least one embodiment. The CU and the DU is connected through an interface, for example, an F1 interface. The CU and the DU is obtained through division based on protocol layers of a wireless network. For example, functions of a radio resource control (radio resource control, RRC) protocol layer, a service data adaptation protocol (service data adaptation protocol, SDAP) layer, and a packet data convergence protocol (packet data convergence protocol, PDCP) layer are set in the CU, and functions of a radio link control (radio link control, RLC) protocol layer, a media access control (media access control, MAC) protocol layer, a physical (physical, PHY) protocol layer, and the like are set in the DU.

Processing function division of the CU and the DU based on the protocol layers is merely an example, and is performed in other manners.

For example, the CU or the DU has functions of more protocol layers through division. For example, the CU or the DU alternatively has some processing functions of the protocol layers through division. In at least one embodiment, some functions of the RLC layer and functions of protocol layers above the RLC layer are set in the CU, and remaining functions of the RLC layer and functions of protocol layers below the RLC layer are set in the DU. In at least one embodiment, functions of the CU or the DU alternatively is obtained through division based on a service type or another system parameter. For example, division is performed based on a latency, a function whose processing time needs to satisfy a latency parameter is disposed in the DU, and a function whose processing time does not need to satisfy the latency parameter is disposed in the CU. In at least one embodiment, the CU alternatively has one or more functions of a core network. One or more CUs is set in a centralized manner or a split manner. For example, CUs is disposed on a network side for ease of centralized management. The DU has a plurality of radio frequency functions, or the radio frequency functions is set remotely.

In some embodiments, the CU includes a CU control plane (CU control plane, CU-CP) and a CU user plane (CU user plane, CU-UP). The CU-CP and the CU-UP is understood as division of the CU from a perspective of a logical function. The CU-CP and the CU-UP is obtained through division based on a protocol layer of a wireless network. For example, a function of an RRC protocol layer and a function that is of a PDCP protocol layer and that corresponds to a signaling radio bearer (signaling radio bearer, SRB) are set in the CU-CP, and a function that is of the PDCP protocol layer and that corresponds to a data radio bearer (data radio bearer, DRB) is set in the CU-UP. In addition, a function of an SDAP protocol layer is also set in the CU-UP.

Functions of the communication apparatus in at least one embodiment is also implemented by using a software function running on hardware, or is implemented by using an instantiated virtualization function on a platform (for example, a cloud platform).

The terminal device 30 in at least one embodiment is a device, for example, a terminal or a chip that is used in a terminal, configured to implement a wireless communication function. The terminal is user equipment (user equipment, UE), an access terminal, a terminal unit, a terminal station, a mobile station, a remote station, a remote terminal, a mobile device, a wireless communication device, a terminal agent, a terminal apparatus, or the like in an IoT, a 5G network, or a future evolved PLMN. The access terminal is a cellular phone, a cordless phone, a session initiation protocol (session initiation protocol, SIP) phone, a wireless local loop (wireless local loop, WLL) station, a personal digital assistant (personal digital assistant, PDA), a handheld device or a computing device having a wireless communication function, another processing device, vehicle-mounted device, or wearable device connected to a wireless modem, a virtual reality (virtual reality, VR) terminal device, an augmented reality (augmented reality, AR) terminal device, a wireless terminal in industrial control (industrial control), a wireless terminal in self driving (self driving), a wireless terminal in remote medical (remote medical), a wireless terminal in a smart grid (smart grid), a wireless terminal in transportation safety (transportation safety), a wireless terminal in a smart city (smart city), a wireless terminal in a smart home (smart home), or the like. The terminal is mobile or is fixed.

The communication system shown in FIG. 1a is merely used as an example, but is not intended to limit the technical solutions in at least one embodiment. A person skilled in the art should understand that, in a specific implementation process, the communication system further includes another device. This is not limited.

At least one embodiment is specifically applied to a multiple input multiple output (multiple input multiple output, MIMO) communication scenario. In the MIMO communication scenario, a plurality of antennas are disposed on both the terminal device and the communication apparatus. A manner in which the communication apparatus maps data to different antennas for sending, so as to obtain different system performance is referred to as precoding.

Figure 1B:
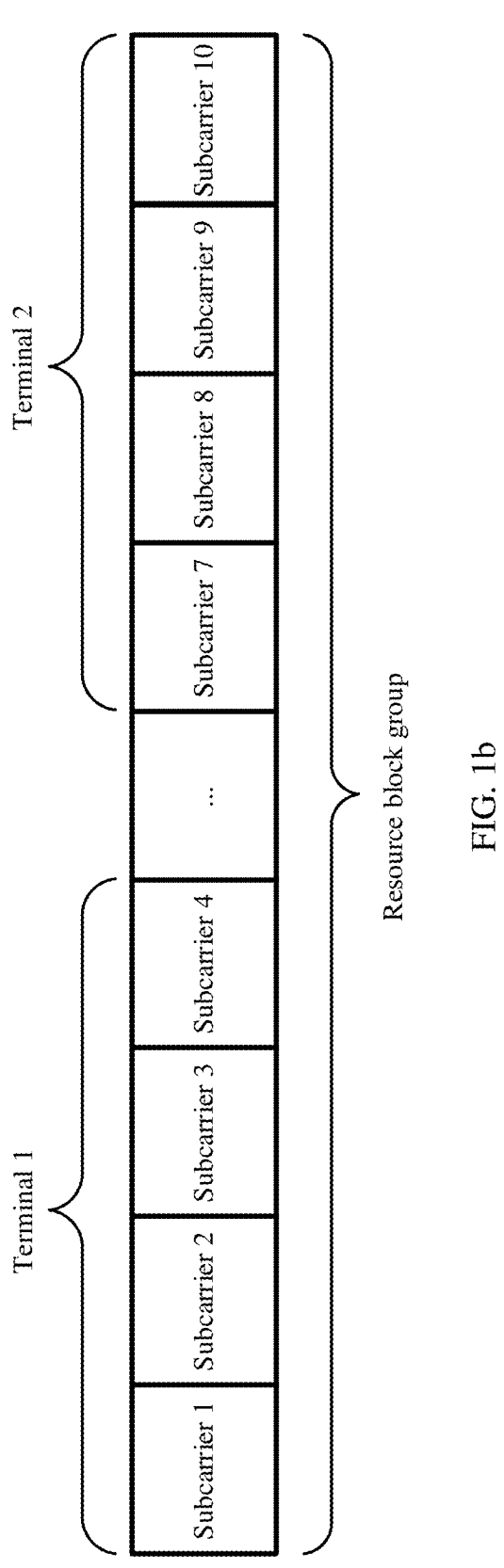
FIG. 1B is a schematic diagram of a resource block group according to at least one embodiment.

Refer to FIG. 1B. The communication apparatus performs precoding based on a resource block group (resource block group, RBG). As shown in FIG. 1B, the resource block group includes a plurality of subcarriers, and different terminal devices 30 correspond to different subcarriers. For example, the terminal devices include a terminal 1 and a terminal 2. A subcarrier 1, a subcarrier 2, a subcarrier 3, and a subcarrier 4 correspond to the terminal 1, and a subcarrier 7, a subcarrier 8, a subcarrier 9, and a subcarrier 10 correspond to the terminal 2. The communication apparatus obtains a channel estimation value corresponding to each subcarrier. The channel estimation value indicates a direction of a channel corresponding to the subcarrier. The communication apparatus calculates, based on channel estimation values corresponding to different terminal devices, precoding weights corresponding to different terminal devices.

Refer to FIG. 2. The following describes a procedure of a precoding weight calculation method according to at least one embodiment.

201: Obtain a plurality of first channel estimation values and a plurality of second channel estimation values based on an RBG.

The RBG includes a plurality of subcarriers, including a plurality of first subcarriers corresponding to a terminal 1 and a plurality of second subcarriers corresponding to a terminal 2. A channel estimation value corresponding to each subcarrier is obtained based on the subcarrier. Specifically, the plurality of corresponding first channel estimation values are obtained based on the plurality of first subcarriers, and the plurality of corresponding second channel estimation values are obtained based on the plurality of second subcarriers.

202: Obtain a first equivalent channel matrix based on some or all of the first channel estimation values, and obtain a second equivalent channel matrix based on some or all of the second channel estimation values.

After the plurality of first channel estimation values and the plurality of second channel estimation values are obtained, the first equivalent channel matrix is obtained based on some or all of the first channel estimation values, and the second equivalent channel matrix is obtained based on some or all of the second channel estimation values. This is not limited herein. For example, the first equivalent channel matrix is obtained. Singular value decomposition is first performed on some or all of the first channel estimation values to obtain a singular value decomposition result $R_k$, where the singular value decomposition result $R_k$ satisfies the following formula (1):

$$R_k = \sum_{q=1}^{Q} H_{q,k} H_{q,k}^H = \breve{U}_k, S_k, V_k \tag{1}$$

In the formula (1), a subscript q corresponds to a subcarrier, a subscript k corresponds to a terminal, and k and q is any positive integers. For example, for the terminal 1, k is 1; and for a first subcarrier of the terminal 1, k is 1 and q is 1.

$H_{q,k}$ represents a channel estimation value corresponding to a $q^{th}$ subcarrier of a $k^{th}$ terminal, and Q represents a quantity of all subcarriers of the $k^{th}$ terminal that participate in calculation.

As shown in the formula (1), the singular value decomposition result $R_k$ includes three matrices: $\breve{U}_k$, $S_k$, and $V_k$. The matrix $\breve{U}_k$ is selected, and the first equivalent channel matrix $U_1$ is obtained based on the matrix $\breve{U}_k$. The first equivalent channel matrix $U_1$ satisfies the following formula (2), where k is 1 or another positive integer.

$$U_k = \breve{U}_k(:,1:m_k) \tag{2}$$

In the formula (2), $m_k$ represents a quantity of layers of data sent to the $k^{th}$ terminal, and the data sent to the $k^{th}$ terminal is referred to as $k^{th}$ piece of data. $U_k$ represents an equivalent channel matrix corresponding to the $k^{th}$ terminal. For example, the terminal 1 is a first terminal, the terminal 2 is a second terminal, an equivalent channel matrix corresponding to the terminal 1 is $U_1$, an equivalent channel matrix corresponding to the terminal 2 is $U_2$, data sent to the terminal 1 is first data, and data sent to the terminal 2 is second data. As shown in the formula (2), "$1:m_k$" indicates that elements in a first column to an $m_k^{th}$ column are selected, and "$:$" on the left of "$,$" indicates that elements in any of the selected first column to $m_k^{th}$ column include an entire column of elements. According to the foregoing description, elements in a first column to an $m_k^{th}$ column of the matrix $\breve{U}_k$ are selected to obtain $U_k$. More specifically, a quantity of rows of $U_k$ is $1_k$, where $1_k$ represents a quantity of transmit antennas of the $k^{th}$ piece of data.

A calculation manner of the second equivalent channel matrix $U_2$ is similar to that of the first equivalent channel matrix $U_1$, and details are not described herein again.

For brevity of description, at least one embodiment is described by using an example in which only the second equivalent channel matrix $U_2$ and the first equivalent channel matrix $U_1$ are included. In actual implementation, an equivalent channel matrix corresponding to another terminal is also obtained, and details are not described herein.

203: Obtain a first equalization coefficient based on some or all of the first channel estimation values and the first equivalent channel matrix, and obtain a second equalization coefficient based on some or all of the second channel estimation values and the second equivalent channel matrix.

After the first equivalent channel matrix $U_1$ and the second equivalent channel matrix $U_2$ are obtained, the first equalization coefficient $B_{q,1}$ is obtained based on some or all of the first channel estimation values and the first equivalent channel matrix $U_1$, and the second equalization coefficient $B_{q,2}$ is obtained based on some or all of the second channel estimation values and the second equivalent channel matrix $U_2$. Some or all of the first channel estimation values in step 203 is consistent with or inconsistent with the some or all of the first channel estimation values in step 202, the some or all of the second channel estimation values is consistent with or inconsistent with the some or all of the second channel estimation values in step 202. This is not specifically limited herein.

For example, the first equalization coefficients $B_{q,1}$ is obtained. The first equalization coefficients $B_{q,1}$ satisfies the following formula (3), where k is 1 or another positive integer.

$$B_{q,k}=(U_k^H H_{q,k} H_{q,k}^H U_k+\sigma^2 I_k)^{-1} U_k^H H_{q,k} \quad (3)$$

where $\sigma^2$ represents noise, $I_k$ is an identity matrix, and a quantity of rows and a quantity of columns of the identity matrix each are a quantity of layers corresponding to the $k^{th}$ piece of data.

In actual implementation, a corresponding first equalization coefficient is calculated based on each first channel estimation value, or one corresponding first equalization coefficient is calculated based on only one of the plurality of first channel estimation values. This is not specifically limited herein.

A calculation manner of the second equalization coefficient $B_{q,2}$ is similar to a calculation manner of the first equalization coefficient $B_{q,1}$, and details are not described herein again.

204: Obtain a plurality of first equivalent channel coefficients based on the first equalization coefficient, and obtain a plurality of second equivalent channel coefficients based on the second equalization coefficient.

After the first equalization coefficient $B_{q,1}$ and the second equalization coefficient $B_{q,2}$ are obtained, the plurality of first equivalent channel coefficients are obtained based on the first equalization coefficient $B_{q,1}$, and the plurality of second equivalent channel coefficients are obtained based on the second equalization coefficient $B_{q,2}$. For example, the plurality of first equivalent channel coefficients are obtained. The first equivalent channel coefficient $H_{q,1}^{eff}$ satisfies the following formula (4), where k is 1 or another positive integer.

$$H_{q,k}^{eff}=H_{q,k}B_{q,k}^H \quad (4)$$

In step 203, in response to one corresponding first equalization coefficient being calculated based on only one of the plurality of first channel estimation values, for example, a first equalization coefficient $B_{x,1}$ is obtained based on a first channel estimation value $H_{x,1}$, where x is any integer from 1 to Q. Therefore, the first equivalent channel coefficient $H_{q,1}^{eff}$ satisfies the following formula (5), where k is 1 or another positive integer.

$$H_{q,k}^{eff}=H_{q,k}B_{x,k}^H \quad (5)$$

A calculation manner of the second equivalent channel coefficient $H_{q,2}^{eff}$ is similar to a calculation manner of the first equivalent channel coefficient $H_{q,1}^{eff}$, and details are not described herein again.

205: Obtain a first precoding weight and a second precoding weight based on the plurality of first equivalent channel coefficients and the plurality of second equivalent channel coefficients.

After the plurality of first equivalent channel coefficients and the plurality of second equivalent channel coefficients are obtained, the first precoding weight and the second precoding weight are obtained based on the plurality of first equivalent channel coefficients and the plurality of second equivalent channel coefficients. The first precoding weight $w_1$ and the second precoding weight $w_2$ satisfy the following formula (6), where k is 1, 2, or another positive integer.

$$w_k=[\Sigma_{k-1}^K \Sigma_{q=1}^Q H_{q,k}^{eff}(H_{q,k}^{eff})^H]^{-1}\Sigma_{q=1}^Q H_{q,k}^{eff} \quad (6)$$

K represents a quantity of all terminals. In actual implementation, a corresponding precoding weight is also correspondingly obtained for another terminal. Details are not described herein again.

206: Precode a signal based on the first precoding weight and the second precoding weight, and output the signal.

After the first precoding weight and the second precoding weight are obtained, the signal is precoded based on the first precoding weight and the second precoding weight, and the signal is output.

In at least one embodiment, in response to a precoding weight being obtained, a plurality of equivalent channel coefficients corresponding to one terminal are calculated, and directions of channels corresponding to a plurality of subcarriers are considered. Therefore, in response to a signal being precoded based on the obtained precoding weight, interference between downlink signals is reduced.

Figure 3:
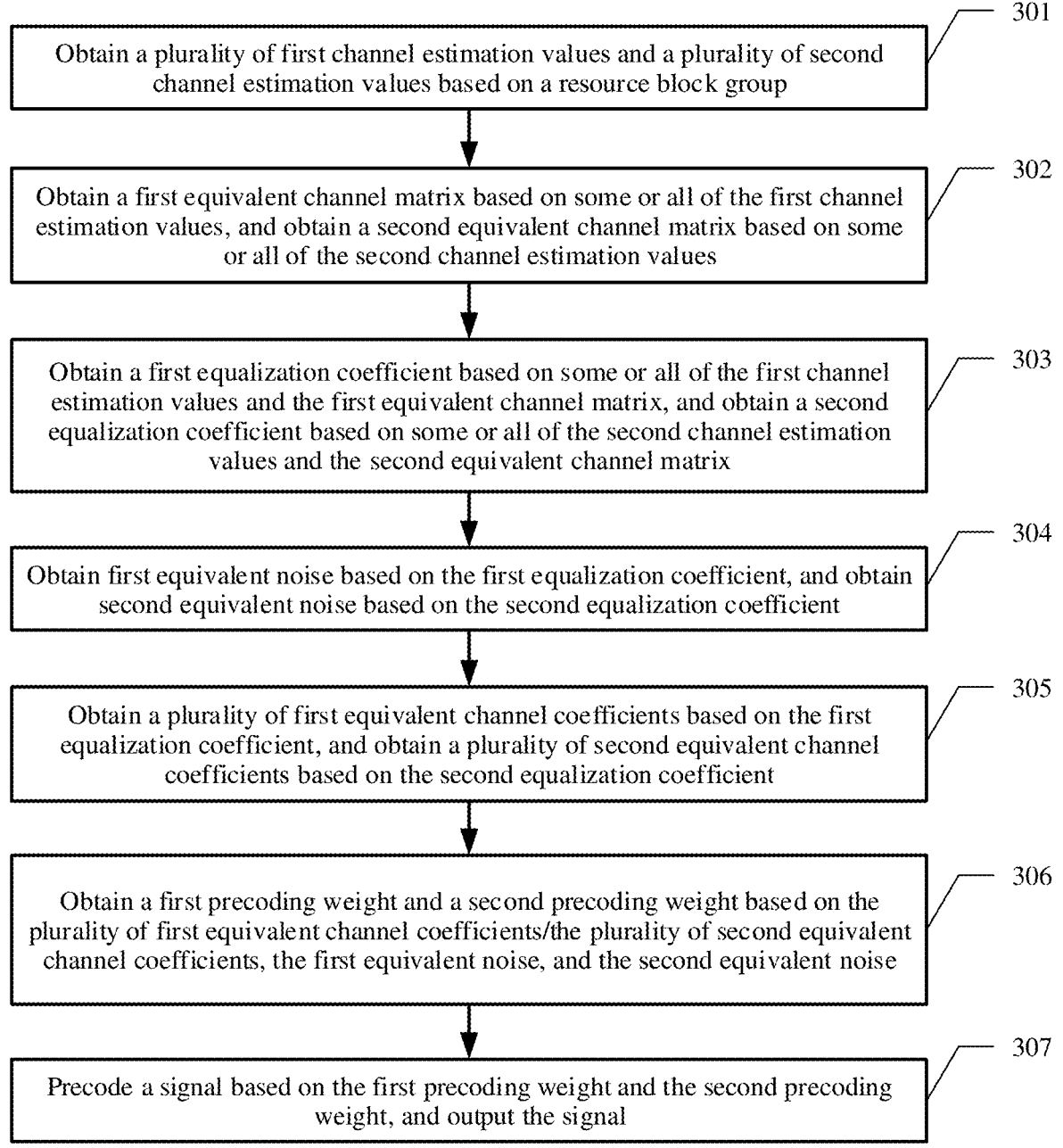

The foregoing describes a procedure of the precoding weight calculation method in at least one embodiment. In actual implementation, based on the embodiment shown in FIG. 2, the precoding weight alternatively is obtained based on an equivalent channel coefficient and equivalent noise. Refer to FIG. 3. Detailed descriptions are provided below.

Step 301 to step 303 in at least one embodiment are similar to step 201 to step 203, and details are not described herein again.

304: Obtain first equivalent noise based on the first equalization coefficient, and obtain second equivalent noise based on the second equalization coefficient.

After the first equalization coefficient and the second equalization coefficient are obtained, the first equivalent noise $\tau_1$ is obtained based on the first equalization coefficient, and the second equivalent noise $\tau_2$ is obtained based on the second equalization coefficient. For example, the first equivalent noise $\tau_1$ is calculated. The first equivalent noise $\tau_1$ satisfies the following formula (7), where k is 1 or another positive integer.

$$\tau_k=\Sigma_{q=1}^Q tr\{\sigma^2 B_{q,k}B_{q,k}^H\} \quad (7)$$

where $tr\{\ \}$ represents calculating a trace of a matrix in the brackets.

A calculation manner of the second equivalent noise $\tau_2$ is similar to a calculation manner of the first equivalent noise $\tau_1$ and details are not described herein again.

305: Obtain a plurality of first equivalent channel coefficients based on the first equalization coefficient, and obtain a plurality of second equivalent channel coefficients based on the second equalization coefficient.

Step 305 in at least one embodiment is similar to step 204 in the embodiment shown in FIG. 2, and details are not described herein again.

306: Obtain a first precoding weight and a second precoding weight based on the plurality of first equivalent channel coefficients, the plurality of second equivalent channel coefficients, the first equivalent noise, and the second equivalent noise.

The first precoding weight $w_1$ and the second precoding weight $w_2$ satisfy the following formula (8), where k is 1, 2, or another positive integer.

$$w_k=[\Sigma_{k=1}^K \Sigma_1^Q H_{q,k}^{eff}(H_{q,k}^{eff})^H+\Sigma_k]^{-1}\Sigma_{q=1}^Q H_{q,k}^{eff} \quad (8)$$

In actual implementation, precoding weights corresponding to more terminals is also obtained, and a specific obtaining manner is not described herein again.

307: Precode a signal based on the first precoding weight and the second precoding weight, and output the signal.

After the first precoding weight and the second precoding weight are obtained, the signal is precoded based on the first precoding weight and the second precoding weight, and the signal is output.

Step 304 is performed before step 305, or is performed after step 305, provided that step 304 is performed after step 303 and before step 306. This is not specifically limited herein.

In at least one embodiment, the precoding weight alternatively is obtained based on the equivalent noise, thereby further improving communication quality.

In actual implementation, based on the embodiment shown in FIG. 3, after the precoding weight is obtained, the precoding weight is further iterated to update the precoding weight. Refer to FIG. 4. Detailed descriptions are provided below.

401: Obtain a first precoding weight and a second precoding weight based on a plurality of first equivalent channel coefficients, a plurality of second equivalent channel coefficients, first equivalent noise, and second equivalent noise.

Step 401 in at least one embodiment is similar to step 306 in the embodiment shown in FIG. 3, and details are not described herein again.

Preceding steps of step 401 in at least one embodiment are also similar to preceding steps of step 306. For brevity of description, details are not repeated in embodiment described herein.

402: Obtain an updated first equalization coefficient and an updated second equalization coefficient based on the first precoding weight and the second precoding weight.

After the first precoding weight and the second precoding weight are obtained, the first equalization coefficient and the second equalization coefficient is updated. For example, the first equalization coefficient is updated. The updated first equalization coefficient $\underline{B}_{q,1}$ and the updated second equalization coefficient $\underline{B}_{q,2}$ satisfy the following formula (9), where k is 1, 2, or another positive integer.

$$\underline{B}_{q,k} = (w_k^H H_{q,k} H_{q,k}^H w_k + \sigma^2 I_k)^{-1} w_{q,k}^H H_{q,k} \tag{9}$$

403: Obtain updated first equivalent noise based on the updated first equalization coefficient, and obtain updated second equivalent noise based on the updated second equalization coefficient.

The updated first equivalent noise $\underline{\tau}_1$ and the updated second equivalent noise $\underline{\tau}_2$ satisfy the following formula (10), where k is 1, 2, or another positive integer.

$$\underline{\tau}_k = \Sigma_{q=1}^{Q} tr\{\sigma^2 \underline{B}_{q,k} \underline{B}_{q,k}^H\} \tag{10}$$

404: Obtain a plurality of updated first equivalent channel coefficients based on the updated first equalization coefficient, and obtain a plurality of updated second equivalent channel coefficients based on the updated second equalization coefficient.

The updated first equivalent channel coefficient $\underline{H}_{q,1}^{eff}$ and the updated second equivalent channel coefficient $\underline{H}_{q,2}^{eff}$ satisfy the following formula (11), where k is 1, 2, or another positive integer.

$$\underline{H}_{q,k}^{eff} = H_{q,k} \underline{B}_{q,k}^H \tag{11}$$

405: Obtain an updated first precoding weight and an updated second precoding weight based on the plurality of updated first equivalent channel coefficients, the plurality of updated second equivalent channel coefficients, the updated first equivalent noise, and the updated second equivalent noise.

The updated first precoding weight $\underline{w}_1$ and the updated second precoding weight $\underline{w}_2$ satisfy the following formula (12), where k is 1, 2, or another positive integer.

$$\underline{w}_k = [\Sigma_{k=1}^{K} \Sigma_q^Q \underline{H}_{q,k}^{eff} (\underline{H}_{q,k}^{eff})^H + \underline{\tau}_k]^{-1} \Sigma_{q=1}^{Q} \underline{H}_{q,k}^{eff} \tag{12}$$

In actual implementation, the iteration process in step 402 to step 405 is repeatedly performed a plurality of times. The iteration process stops after a result of the precoding weight no longer changes, or the iteration process stops after a specified quantity of iterations are performed. This is not specifically limited herein.

406: Precode a signal based on the updated first precoding weight and the updated second precoding weight, and output the signal.

After the updated first precoding weight and the updated second precoding weight are obtained, the signal is precoded based on the updated first precoding weight and the updated second precoding weight, and the signal is output.

In at least one embodiment, the obtained precoding weight is iterated a plurality of times to obtain better communication quality.

The foregoing describes a manner of obtaining an equalization coefficient based on an equivalent channel matrix. In actual implementation, an initial precoding weight is first obtained based on the equivalent channel matrix, and then the equalization coefficient is obtained based on the initial precoding weight. Refer to FIG. 5. Detailed descriptions are provided below.

Step 501 to step 502 in this embodiment are similar to step 201 to step 202 in the embodiment shown in FIG. 2, and details are not described herein again.

503: Obtain a first initial precoding weight and a second initial precoding weight based on the first equivalent channel matrix and the second equivalent channel matrix.

After the first equivalent channel matrix $U_1$ and the second equivalent channel matrix $U_2$ are obtained, the first equivalent channel matrix $U_1$ and the second equivalent channel matrix $U_2$ is combined to form a combined equivalent channel matrix $U_z$. The combined equivalent channel matrix $U_z$ satisfies the following formula (13):

$$U_z = [U_1, U_2] \tag{13}$$

From the formula (13), the combined equivalent channel matrix $U_z$ is obtained by combining the first equivalent channel matrix $U_1$ and the second equivalent channel matrix $U_2$ in a sequence from left to right. In response to equivalent channel matrices corresponding to other terminals being further obtained in actual implementation, the equivalent channel matrices is also combined to form a combined equivalent channel matrix Uz in the foregoing manner.

After the combined equivalent channel matrix $U_z$ is obtained, a combined initial precoding weight $w_z$ is obtained based on the combined equivalent channel matrix $U_z$. The combined initial precoding weight $w_z$ satisfies the following formula (14):

$$W_z = U_z (U_z^H U_z + \sigma^2 \tilde{I})^{-1} \tag{14}$$

where $\tilde{I}$ is an identity matrix, and a quantity of rows and a quantity of columns of the identity matrix each are a total quantity of layers of data sent to a total of k terminals.

After the combined initial precoding weight $W_z$ is obtained, the combined initial precoding weight $W_z$ is split to obtain the first initial precoding weight $W_1$ and the second initial precoding weight $W_2$. The combined initial precoding weight $W_z$ further satisfies the following formula (15):

$$W_z = [w_1, W_2] \tag{15}$$

From the formula (15), the combined initial precoding weight $W_z$ is formed by combining a plurality of initial precoding weights in a sequence from left to right, so as to obtain the first initial precoding weight $w_1$ and the second initial precoding weight $w_2$.

504: Obtain a first equalization coefficient based on some or all of the first channel estimation values and the first initial precoding weight, and obtain a second equalization coefficient based on some or all of the second channel estimation values and the second initial precoding weight.

Step 504 in this embodiment is similar to step 203 in the embodiment shown in FIG. 2, and a difference lies in that the equivalent channel matrix in step 203 is replaced with the initial precoding weight to participate in calculation. Specifically, the first equalization coefficient $B_{q,1}$ and the second equalization coefficient $B_{q,2}$ satisfy the following formula (16), where k is 1, 2, or another positive integer.

$$B_{q,k}=(W_k{}^H H_{q,k} H_{q,k}{}^H W_k+\sigma^2 I_k)^{-1} W_k{}^H H_{q,k} \tag{16}$$

Step 505 to step 507 in this embodiment are similar to step 204 to step 206 in the embodiment shown in FIG. 2, and details are not described herein again.

In at least one embodiment, the initial precoding weight is first obtained based on the equivalent channel matrix, and then the initial precoding weight participates in subsequent calculation of obtaining the precoding weight, so that the obtained precoding weight further improves communication quality.

Based on the embodiment shown in FIG. 5, the precoding weight alternatively is obtained based on an equivalent channel coefficient and equivalent noise. Refer to FIG. 6. Detailed descriptions are provided below.

Step 601 to step 604 in this embodiment are similar to step 501 to step 504 in the embodiment shown in FIG. 5, and details are not described herein again.

605: Obtain first equivalent noise based on the first equalization coefficient, and obtain second equivalent noise based on the second equalization coefficient.

Calculation manners of the first equivalent noise $\tau_1$ and the second equivalent noise $\tau_2$ are similar to those in step 304 in the embodiment shown in FIG. 3, and details are not described herein again.

Step 606 to step 608 in this embodiment are similar to step 305 to step 307 in the embodiment shown in FIG. 3, and details are not described herein again.

In at least one embodiment, the precoding weight alternatively is obtained based on the equivalent noise, thereby further improving communication quality.

In actual implementation, based on the embodiment shown in FIG. 6, after the precoding weight is obtained, the precoding weight is further iterated to update the precoding weight. Refer to FIG. 7. Detailed descriptions are provided below.

In this embodiment, step 701 is similar to step 607 in the embodiment shown in FIG. 6, and step 702 to step 706 are similar to step 402 to step 406 in the embodiment shown in FIG. 4. Details are not described herein again.

Preceding steps of step 701 are also similar to preceding steps of step 607 in the embodiment shown in FIG. 6. For brevity of description, details are not described herein again in this embodiment.

In at least one embodiment, the obtained precoding weight is iterated a plurality of times to obtain better communication quality.

The foregoing describes a manner of obtaining the first equivalent channel matrix and the second equivalent channel matrix. In actual implementation, the first equivalent channel matrix and the second equivalent channel matrix alternatively is obtained in another manner. Refer to FIG. 8. Detailed descriptions are provided below.

801: Obtain a plurality of first channel estimation values and a plurality of second channel estimation values based on an RBG.

Step 801 in this embodiment is similar to step 201 in the embodiment shown in FIG. 2, and details are not described herein again.

802: Obtain a third equivalent channel matrix based on some or all of the first channel estimation values, and obtain a fourth equivalent channel matrix based on some or all of the second channel estimation values.

After the plurality of first channel estimation values and the plurality of second channel estimation values are obtained, the third equivalent channel matrix is obtained based on some or all of the first channel estimation values, and the fourth equivalent channel matrix is obtained based on some or all of the second channel estimation values. This is not specifically limited herein. The third equivalent channel matrix has a correspondence with a terminal 1, and the fourth equivalent channel matrix has a correspondence with a terminal 2.

For example, the third equivalent channel matrix $\tilde{U}_1$ is obtained. Singular value decomposition is first performed on some or all of the first channel estimation values to obtain a singular value decomposition result $R_k$, where the singular value decomposition result $R_k$ satisfies the foregoing formula (1).

After the singular value decomposition result $R_k$ is obtained, a matrix $\breve{U}_k$ is selected, and the third equivalent channel matrix $\tilde{U}_1$ is obtained based on the matrix $\breve{U}_k$. The third equivalent channel matrix $\tilde{U}_1$ satisfies the following formula (17), where k is 1 or another positive integer.

$$\tilde{U}_k=\breve{U}_k(:,1:n_k) \tag{17}$$

where $n_k$ represents a quantity of receive antennas of a $k^{th}$ piece of data, and the $k^{th}$ piece of data is used to be sent to a $k^{th}$ terminal; and as shown in the formula (17), the first $n_k$ columns of elements in a matrix U are selected to obtain $\tilde{U}_k$, and more specifically, a quantity of rows of $\tilde{U}_k$ is $l_k$.

A calculation manner of the fourth equivalent channel matrix $\tilde{U}_2$ is similar to a calculation manner of the third equivalent channel matrix $\tilde{U}_1$, and details are not described herein again.

803: Obtain a first equivalent channel matrix based on the third equivalent channel matrix and a first matrix, and obtain a second equivalent channel matrix based on the fourth equivalent channel matrix and a second matrix.

After the third equivalent channel matrix $\tilde{U}_1$ and the fourth equivalent channel matrix $\tilde{U}_2$ are obtained, the first equivalent channel matrix $U_1$ is obtained based on the third equivalent channel matrix $\tilde{U}_1$ and the first matrix $G_1$, and the second equivalent channel matrix $U_2$ is obtained based on the fourth equivalent channel matrix $\tilde{U}_2$ and the second matrix $G_2$.

The first matrix $G_1$ and the second matrix $G_2$ satisfy the following formula (18), where k is 1, 2, or another positive integer.

$$G_k = \left[\frac{I_k}{0_k}\right] \tag{18}$$

where $I_k$ represents an identity matrix of $m_k \times m_k$, and $0_k$ represents an all-0 matrix of $(n_k-m_k) \times m_k$.

Specifically, the first equivalent channel matrix $U_1$ and the second equivalent channel matrix $U_2$ further satisfy the following formula (19), where k is 1, 2, or another positive integer.

$$U_k = \tilde{U}_k G_k \qquad (19)$$

The first equivalent channel matrix $U_1$ and the second equivalent channel matrix $U_2$ is obtained by using the formula (19).

Step 804 to step 808 in this embodiment are similar to step 503 to step 507 in the embodiment shown in FIG. 5, and details are not described herein again.

The foregoing describes a manner of obtaining an equalization coefficient directly based on an initial precoding weight. In actual implementation, based on the embodiment shown in FIG. 8, the initial precoding weight is also updated in an iterative manner, and then the equalization coefficient is obtained. Refer to FIG. 9. Detailed descriptions are provided below.

901: Obtain a first initial precoding weight and a second initial precoding weight based on the first equivalent channel matrix and the second equivalent channel matrix.

Step 901 in this embodiment is similar to step 804 in the embodiment shown in FIG. 8, and details are not described herein again.

Preceding steps of this step are similar to preceding steps in the embodiment shown in FIG. 8. For brevity of description, details are not described herein again in this embodiment.

902: Obtain a third matrix based on the first initial precoding weight and the third equivalent channel matrix, and obtain a fourth matrix based on the second initial precoding weight and the fourth equivalent channel matrix.

The third matrix $\tilde{G}_1$ is obtained based on the first initial precoding $w_1$ and the third equivalent channel matrix $\tilde{U}_1$, and the fourth matrix $\tilde{G}_2$ is obtained based on the second initial precoding $w_2$ and the fourth equivalent channel matrix $\tilde{U}_2$. The third matrix $\tilde{G}_1$ and the fourth matrix $\tilde{G}_2$ satisfy the following formula (20), where k is 1, 2, or another positive integer.

$$\tilde{G}_k = \tilde{U}_k^H w_k \qquad (20)$$

903: Obtain a fifth equivalent channel matrix based on the third matrix and the third equivalent channel matrix, and obtain a sixth equivalent channel matrix based on the fourth matrix and the fourth equivalent channel matrix.

After the third matrix $\tilde{G}_1$ and the fourth matrix $\tilde{G}_2$ are obtained, the fifth equivalent channel matrix $\hat{U}_1$ is obtained based on the third matrix $\tilde{G}_1$ and the third equivalent channel matrix $\tilde{U}_1$, and the sixth equivalent channel matrix $\hat{U}_2$ is obtained based on the fourth matrix $\tilde{G}_2$ and the fourth equivalent channel matrix $\tilde{U}_2$. The fifth equivalent channel matrix $\hat{U}_1$ and the sixth equivalent channel matrix $\hat{U}_2$ satisfy the following formula (21), where k is 1, 2, or another positive integer.

$$\hat{U}_k = \tilde{U}_k \tilde{G}_k \qquad (21)$$

904: Obtain a fifth matrix and a sixth matrix based on the fifth equivalent channel matrix and the sixth equivalent channel matrix.

After the fifth equivalent channel matrix $\hat{U}_1$ and the sixth equivalent channel matrix $\hat{U}_2$ are obtained, the fifth matrix $d_1$ and the sixth matrix $d_2$ are obtained based on the fifth equivalent channel matrix $\hat{U}_1$ and the sixth equivalent channel matrix $\hat{U}_2$. A specific obtaining manner is similar to the manner of obtaining the first initial precoding weight and the second initial precoding weight based on the first equivalent channel matrix and the second equivalent channel matrix in the embodiment shown in FIG. 5, and details are not described herein again. In at least one embodiment, after the fifth matrix $d_1$ and the sixth matrix $d_2$ are obtained, the first initial precoding weight $w_1$ is updated to the fifth matrix $d_1$, and the second initial precoding weight $w_2$ is updated to the sixth matrix $d_2$.

In actual implementation, step 902 to step 904 continue to be repeated by using the fifth matrix $d_1$ and the sixth matrix $d_2$, and the iteration does not stop until an updated first initial precoding weight and an updated second initial precoding weight no longer change, or the iteration stops after a preset quantity of repetitions. This is not specifically limited herein.

After the first initial precoding weight and the second initial precoding weight are obtained, the first initial precoding weight and the second initial precoding weight is used for subsequent calculation of obtaining the first precoding weight and the second precoding weight. A specific calculation process is similar to that in each of embodiments shown in FIG. 5, FIG. 6, and FIG. 7, and details are not described herein again.

The foregoing describes the precoding weight calculation method in at least one embodiment. The following describes a communication apparatus in at least one embodiment.

FIG. 10 is a schematic diagram of a communication apparatus according to at least one embodiment. The communication apparatus 1000 is configured to implement the steps in the foregoing method. As shown in FIG. 10, the communication apparatus 1000 includes an interface module 1001 and a processing module 1002.

In at least one embodiment, the processing module 1002 is configured to obtain a plurality of first channel estimation values and a plurality of second channel estimation values based on an RBG, where the plurality of first channel estimation values respectively correspond to a plurality of first subcarriers, the plurality of second channel estimation values respectively correspond to a plurality of second subcarriers, and the plurality of first subcarriers and the plurality of second subcarriers are included in the RBG.

The processing module 1002 is further configured to: obtain a first equalization coefficient based on some or all of the plurality of first channel estimation values, and obtain a second equalization coefficient based on some or all of the plurality of second channel estimation values.

The processing module 1002 is further configured to: obtain a plurality of first equivalent channel coefficients based on the first equalization coefficient, and obtain a plurality of second equivalent channel coefficients based on the second equalization coefficient.

The processing module 1002 is further configured to obtain a first precoding weight and a second precoding weight based on the plurality of first equivalent channel coefficients and the plurality of second equivalent channel coefficients.

The processing module 1002 is further configured to precode a signal based on the first precoding weight and the second precoding weight.

The interface module 1001 is configured to output the signal.

In an optional implementation, the processing module 1002 is further configured to: obtain a first equivalent channel matrix based on some or all of the plurality of first channel estimation values, and obtain a second equivalent channel matrix based on some or all of the plurality of second channel estimation values.

The processing module 1002 is specifically configured to: obtain the first equalization coefficient based on some or all of the plurality of first channel estimation values and the first equivalent channel matrix, and obtain the second equalization coefficient based on some or all of the plurality of second channel estimation values and the second equivalent channel matrix.

In an optional implementation, the processing module 1002 is further configured to obtain a first initial precoding weight and a second initial precoding weight based on the first equivalent channel matrix and the second equivalent channel matrix.

The processing module 1002 is specifically configured to: obtain the first equalization coefficient based on some or all of the plurality of first channel estimation values and the first initial precoding weight, and obtain the second equalization coefficient based on some or all of the plurality of second channel estimation values and the second initial precoding weight.

In an optional implementation, the processing module 1002 is further configured to: obtain a third equivalent channel matrix based on some or all of the plurality of first channel estimation values, and obtain a fourth equivalent channel matrix based on some or all of the plurality of second channel estimation values, where the third equivalent channel matrix is a matrix of $l_1 \times n_1$, $l_1$ represents a quantity of transmit antennas of first data, the fourth equivalent channel matrix is a matrix of $l_2 \times n_2$, $l_2$ represents a quantity of transmit antennas of second data, $n_1$ represents a quantity of receive antennas corresponding to the first data, and $n_2$ represents a quantity of receive antennas corresponding to the second data.

The processing module 1002 is specifically configured to: obtain the first equivalent channel matrix based on the third equivalent channel matrix and a first matrix $G_1$, and obtain the second equivalent channel matrix based on the fourth equivalent channel matrix and a second matrix $G_2$, where the first matrix $G_1$ satisfies $$G_1 = \left[ \frac{I_1}{0_1} \right],$$

$I_1$ represents an identity matrix of $m_1 \times m_1$, $m_1$ represents a quantity of layers corresponding to the first data, and $0_1$ represents an all-0 matrix of $(n_1 - m_1) \times m_1$; and the second matrix $G_2$ satisfies $$G_2 = \left[ \frac{I_2}{0_2} \right],$$

$I_2$ represents an identity matrix of $m_2 \times m_2$, $m_2$ represents a quantity of layers corresponding to the second data, and $0_2$ represents an all-0 matrix of $(n_2 - m_2) \times m_2$.

In an optional implementation, the processing module 1002 is further configured to: obtain a third matrix based on the first initial precoding weight and the third equivalent channel matrix, and obtain a fourth matrix based on the second initial precoding weight and the fourth equivalent channel matrix.

The processing module 1002 is further configured to: obtain a fifth equivalent channel matrix based on the third matrix and the third equivalent channel matrix, and obtain a sixth equivalent channel matrix based on the fourth matrix and the fourth equivalent channel matrix.

The processing module 1002 is further configured to: obtain a fifth matrix and a sixth matrix based on the fifth equivalent channel matrix and the sixth equivalent channel matrix, update the first initial precoding weight to the fifth matrix, and update the second initial precoding weight to the sixth matrix.

In an optional implementation, the processing module 1002 is further configured to: obtain first equivalent noise based on the first equalization coefficient, and obtain second equivalent noise based on the second equalization coefficient.

The processing module 1002 is specifically configured to obtain the first precoding weight and the second precoding weight based on the plurality of first equivalent channel coefficients, the plurality of second equivalent channel coefficients, the first equivalent noise, and the second equivalent noise.

Division into the units in the communication apparatus is merely logical function division. In actual implementation, all or some of the units is integrated into a physical entity, or is physically separated. In addition, the units in the communication apparatus are implemented in a form of software invoked by a processing element, or are implemented in a form of hardware; or some of the units is implemented in a form of software invoked by a processing element, and some of the units is implemented in a form of hardware. For example, each unit is a separately disposed processing element, or is integrated into a chip of the communication apparatus for implementation. In addition, each unit alternatively is stored in a memory in a form of a program to be invoked by a processing element of the communication apparatus to perform a function of the unit. Moreover, all or some of the units is integrated, or is implemented independently. The processing element herein is also referred to as a processor, and is an integrated circuit having a signal processing capability. During implementation, the steps in the foregoing methods or the foregoing units is implemented by using a hardware integrated logic circuit in the processor element, or is implemented in a form of software invoked by the processing element.

In an example, the unit in any one of the foregoing communication apparatuses is one or more integrated circuits configured to implement the foregoing methods, for example, one or more application-specific integrated circuits (application-specific integrated circuits, ASICs), one or more microprocessors (digital signal processors, DSPs), one or more field programmable gate arrays (field programmable gate arrays, FPGAs), or a combination of at least two of these integrated circuit forms. For another example, in response to the unit in the communication apparatus being implemented in a form of scheduling a program by a processing element, the processing element is a general-purpose processor, for example, a central processing unit (central processing unit, CPU) or another processor that invokes the program. For still another example, the units is integrated and implemented in a form of a system-on-a-chip (system-on-a-chip, SOC).

Figure 11:
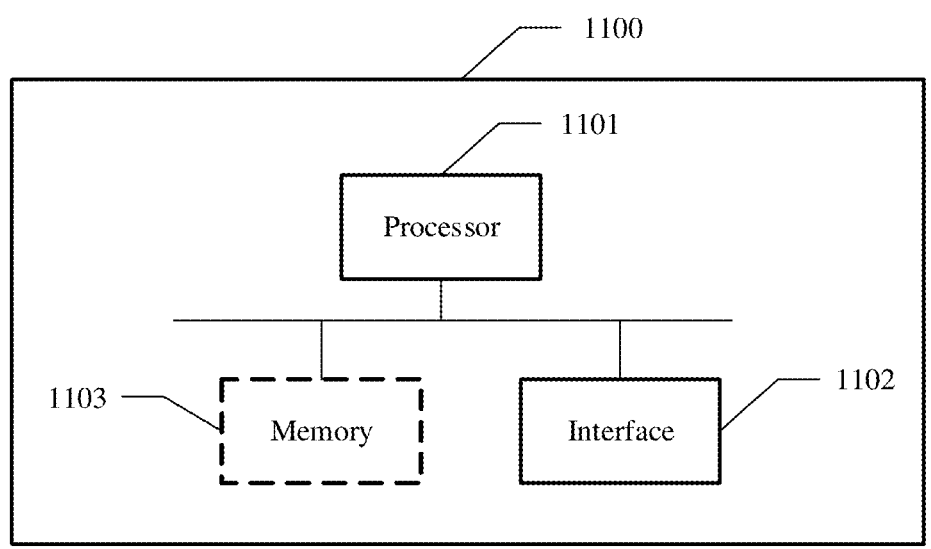
FIG. 11 is a schematic diagram of another structure of a communication apparatus according to at least one embodiment.

FIG. 11 is a schematic diagram of a communication apparatus according to at least one embodiment. The communication apparatus is configured to implement the methods in the foregoing embodiments. As shown in FIG. 11, the communication apparatus 1100 includes a processor 1101 and an interface 1102. The processor 1101 is coupled to the interface 1102. The interface 1102 is configured to communicate with another device. The interface 1102 is a transceiver or an input/output interface. The interface 1102 is an interface circuit. Optionally, the communication apparatus 1100 further includes a memory 1103, configured to: store instructions executed by the processor 1101, store input data used by the processor 1101 to run the instructions, or store data generated after the processor 1101 runs the instructions.

The methods performed by the communication apparatus in the foregoing embodiments is implemented by the processor 1101 by invoking a program stored in a memory (which is a memory 1103, or is an external memory). In other words, the communication apparatus includes the processor 1101, and the processor 1101 invokes the program in the memory to perform the methods in the foregoing method embodiments. The processor herein is an integrated circuit having a signal processing capability, for example, a CPU. The communication apparatus is implemented by one or more integrated circuits configured to implement the foregoing methods, for example, one or more ASICs, one or more microprocessors DSPs, one or more FPGAs, or a combination of at least two of the integrated circuit forms; or is implemented by combining the foregoing implementations.

In at least one embodiment, a computer-readable storage medium is further provided. The computer-readable storage medium stores computer-executable instructions. In response to a processor of a device executing the computer-executable instructions, the device performs the precoding weight calculation method in the foregoing method embodiment.

A person skilled in the art understand that, for convenient and brief description, for specific working processes of the system, apparatus, and unit described above, refer to corresponding processes in the foregoing method embodiments. Details are not described herein again.

In the several embodiments provided in at least one embodiment, the disclosed system, apparatus, and method is implemented in other manners. For example, the apparatus embodiments described above are merely examples. For example, division of the units is merely logical function division, and there is another division manner in actual implementation. For example, a plurality of units or components is combined or integrated into another system, or some features is ignored or not performed. In addition, the displayed or discussed mutual couplings or direct couplings or communication connections is implemented through some interfaces. The indirect couplings or communication connections between the apparatuses or units is implemented in an electrical form, a mechanical form, or another form.

The units described as separate parts may or may not be physically separate, and parts displayed as units may or may not be physical units, that is, is located in one place, or is distributed on a plurality of network units. Some or all of the units is selected based on actual usage to achieve the objectives of the solutions of embodiments.

In addition, functional units in at least one embodiment are integrated into one processing unit, each of the units exist alone physically, or two or more units is integrated into one unit. The integrated unit is implemented in a form of hardware, or is implemented in a form of a software functional unit.

In response to the integrated unit being implemented in a form of a software functional unit and sold or used as an independent product, the integrated unit is stored in a computer-readable storage medium. Based on such an understanding, the technical solutions in at least one embodiment essentially, or the part contributing to the conventional technology, or all or some of the technical solutions is implemented in a form of a software product. The computer software product is stored in a storage medium, and includes several instructions for instructing a computer device (which is a personal computer, a server, a network device, or the like) to perform all or some of the steps of the methods in at least one embodiment. The foregoing storage medium includes any medium that stores program code, such as a USB flash drive, a removable hard disk, a read-only memory (ROM, read-only memory), a random access memory (RAM, random access memory), a magnetic disk, or an optical disc.

What is claimed is:

1. A precoding weight calculation method, comprising:

obtaining a plurality of first channel estimation values and a plurality of second channel estimation values based on a resource block group (RBG), wherein the plurality of first channel estimation values respectively correspond to a plurality of first subcarriers corresponding to a first terminal, the plurality of the second channel estimation values correspond to a plurality of second subcarriers corresponding to a second terminal, and the plurality of the first subcarriers and the plurality of the second subcarriers are included in the RBG;

obtaining a first equivalent channel matrix based on some or all of the plurality of the first channel estimation values, and obtaining a second equivalent channel matrix based on some or all of the plurality of the second channel estimation values;

obtaining a plurality of first equivalent channel coefficients based on some or all of the first channel estimation values and the first equivalent channel matrix, and obtain a plurality second equivalent channel coefficients based on some or all of the second channel estimation values and the second equivalent channel matrix;

after the plurality of first equivalent channel coefficients and the plurality of second equivalent channel coefficients are obtained, obtaining a first precoding weight and a second precoding weight based on the plurality of the first equivalent channel coefficients and the plurality of the second equivalent channel coefficients;

precoding a signal based on the first precoding weight and the second precoding weight; and outputting the signal.

2. The method according to claim 1, wherein obtaining a first equalization coefficient based on some or all of the plurality of the first channel A estimation values and the first equivalent channel matrix, and obtaining second equalization coefficient based on some or all of the plurality of the second channel estimation values and the second equivalent channel matrix includes:

obtaining a first initial precoding weight and a second initial precoding weight based on the first equivalent channel matrix and the second equivalent channel matrix; and obtaining the first equalization coefficient based on some or all of the plurality of the first channel estimation values and the first initial precoding weight, and obtaining the second equalization coefficient based on some or all of the plurality of the second channel estimation values and the second initial precoding weight.

3. The method according to claim 2, wherein the obtaining the first equivalent channel matrix based on some or all of the plurality of the first channel estimation values, and obtaining the second equivalent channel matrix based on some or all of the plurality of the second channel estimation values includes:

obtaining a third equivalent channel matrix based on some or all of the plurality of the first channel estimation values, and obtaining a fourth equivalent channel matrix based on some or all of the plurality of the second channel estimation values, wherein the third equivalent channel matrix is a matrix of $l_1 \times n_1$, $l_1$ represents a quantity of transmit antennas of first data, the fourth equivalent channel matrix is a matrix of $l_2 \times n_2$, $l_2$ represents a quantity of transmit antennas of second data, $n_1$ represents a quantity of receive antennas corresponding to the first data, and $n_2$ represents a quantity of receive antennas corresponding to the second data; and obtaining the first equivalent channel matrix based on the third equivalent channel matrix and a first matrix $G_1$, and obtaining the second equivalent channel matrix based on the fourth equivalent channel matrix and a second matrix $G_2$, wherein the first matrix $G_1$ satisfies $$G_1 = \left[ \frac{I_1}{0_1} \right],$$

$I_1$ represents an identity matrix of $m_1 \times m_1$, $m_1$ represents a quantity of layers corresponding to the first data, and $\theta_1$ represents an all-0 matrix of $(n_1 - m_1) \times m_1$; and the second matrix $G_2$ satisfies $$G_2 = \left[ \frac{I_2}{0_2} \right],$$

$I_2$ represents an identity matrix of $m_2 \times m_2$, $m_2$ represents a quantity of layers corresponding to the second data, and $0_2$ represents an all-0 matrix of $(n_2 - m_2) \times m_2$.

4. The method according to claim 3, wherein before the obtaining the first equalization coefficient based on some or all of the plurality of the first channel estimation values and the first initial precoding weight, and obtaining the second equalization coefficient based on some or all of the plurality of the second channel estimation values and the second initial precoding weight, the method further comprises:

obtaining a third matrix based on the first initial precoding weight and the third equivalent channel matrix, and obtaining a fourth matrix based on the second initial precoding weight and the fourth equivalent channel matrix;

obtaining a fifth equivalent channel matrix based on the third matrix and the third equivalent channel matrix, and obtaining a sixth equivalent channel matrix based on the fourth matrix and the fourth equivalent channel matrix; and obtaining a fifth matrix and a sixth matrix based on the fifth equivalent channel matrix and the sixth equivalent channel matrix, updating the first initial precoding weight to the fifth matrix, and updating the second initial precoding weight to the sixth matrix.

5. The method according to claim 1, wherein the method further comprises:

obtaining first equivalent noise based on the first equalization coefficient, and obtaining second equivalent noise based on the second equalization coefficient; and the obtaining the first precoding weight and the second precoding weight based on the plurality of the first equivalent channel coefficients and the plurality of the second equivalent channel coefficients includes:

obtaining the first precoding weight and the second precoding weight based on the plurality of the first equivalent channel coefficients, the plurality of the second equivalent channel coefficients, the first equivalent noise, and the second equivalent noise.

6. An apparatus, comprising:

one or more processors coupled to memory storing instructions for execution by the one or more processors to:

obtain a plurality of first channel estimation values and a plurality of second channel estimation values based on a resource block group (RBG), wherein the plurality of the first channel estimation values respectively correspond to a plurality of first subcarriers corresponding to a first terminal, the plurality of the second channel estimation values correspond to a plurality of second subcarriers corresponding to a second terminal, and the plurality of the first subcarriers and the plurality of the second subcarriers are included in the RBG;

obtain a first equivalent channel matrix based on some or all of the plurality of the first channel estimation values, and obtain a second equivalent channel matrix based on some or all of the plurality of the second channel estimation values;

obtain a plurality of first equivalent channel coefficients based on some or all of the first channel estimation values and the first equivalent channel matrix, and obtain a plurality second equivalent channel coefficients based on some or all of the second channel estimation values and the second equivalent channel matrix;

after the plurality of first equivalent channel coefficients and the plurality of second equivalent channel coefficients are obtained, obtain a first precoding weight and a second precoding weight based on the plurality of the first equivalent channel coefficients and the plurality of the second equivalent channel coefficients;

precode a signal based on the first precoding weight and the second precoding weight; and output the signal.

7. The apparatus according to claim 6, wherein the one or more processors are configured to obtain a first equalization coefficient based on some or all of the plurality of the first channel estimation values and the first equivalent channel matrix, and to obtain a second equalization coefficient based on some or all of the plurality of the second channel estimation values and the second equivalent channel matrix, by:

obtaining a first initial precoding weight and a second initial precoding weight based on the first equivalent channel matrix and the second equivalent channel matrix; and obtaining the first equalization coefficient based on some or all of the plurality of the first channel estimation values and the first initial precoding weight, and obtaining the second equalization coefficient based on some or all of the plurality of the second channel estimation values and the second initial precoding weight.

8. The apparatus according to claim 7, wherein the one or more processors are configured to obtain the first equivalent channel matrix based on some or all of the plurality of the first channel estimation values, and to obtain the second equivalent channel matrix based on some or all of the plurality of the second channel estimation values, by:

obtaining a third equivalent channel matrix based on some or all of the plurality of the first channel estimation values, and obtaining a fourth equivalent channel matrix based on some or all of the plurality of the second channel estimation values, wherein the third equivalent channel matrix is a matrix of $l_1 \times n_1$, $l_1$ represents a quantity of transmit antennas of first data, the fourth equivalent channel matrix is a matrix of $l_2 \times n_2$, $l_2$ represents a quantity of transmit antennas of second data, $n_1$ represents a quantity of receive antennas corresponding to the first data, and $n_2$ represents a quantity of receive antennas corresponding to the second data; and obtaining the first equivalent channel matrix based on the third equivalent channel matrix and a first matrix $G_1$, and obtaining the second equivalent channel matrix based on the fourth equivalent channel matrix and a second matrix $G_2$, wherein the first matrix $G_1$ satisfies $$G_1 = \left[ \frac{I_1}{0_1} \right],$$

$I_1$ represents an identity matrix of $m_1 \times m_1$, $m_1$ represents a quantity of layers corresponding to the first data, and $O_i$ represents an all-0 matrix of $(n_1 - m_1) \times m_1$; and the second matrix $G_2$ satisfies $$G_2 = \left[ \frac{I_2}{0_2} \right],$$

$I_2$ represents an identity matrix of $m_2 \times m_2$, $m_2$ represents a quantity of layers corresponding to the second data, and $0_2$ represents an all-0 matrix of $(n_2 - m_2) \times m_2$.

9. The apparatus according to claim 8, wherein the apparatus is further caused to:

obtain a third matrix based on the first initial precoding weight and the third equivalent channel matrix, and obtaining a fourth matrix based on the second initial precoding weight and the fourth equivalent channel matrix;

obtain a fifth equivalent channel matrix based on the third matrix and the third equivalent channel matrix, and obtaining a sixth equivalent channel matrix based on the fourth matrix and the fourth equivalent channel matrix; and obtain a fifth matrix and a sixth matrix based on the fifth equivalent channel matrix and the sixth equivalent channel matrix, updating the first initial precoding weight to the fifth matrix, and updating the second initial precoding weight to the sixth matrix.

10. The apparatus according to claim 6, wherein the one or more processors are further configured to:

obtain first equivalent noise based on the first equalization coefficient, and to obtain second equivalent noise based on the second equalization coefficient;

obtain a first precoding weight and a second precoding weight based on the plurality of the first equivalent channel coefficients and the plurality of the second equivalent channel coefficients; and obtain the first precoding weight and the second precoding weight based on the plurality of the first equivalent channel coefficients, the plurality of the second equivalent channel coefficients, the first equivalent noise, and the second equivalent noise.

11. A non-transitory computer readable medium storing instructions that are executable by a processor, to cause the processor to perform operations comprising:

obtaining a plurality of first channel estimation values and a plurality of second channel estimation values based on a resource block group (RBG), wherein the plurality of the first channel estimation values respectively correspond to a plurality of first subcarriers corresponding to a first terminal, the plurality of the second channel estimation values correspond to a plurality of second subcarriers corresponding to a second terminal, and the plurality of first subcarriers and the plurality of second subcarriers are included in the RBG;

obtaining a first equivalent channel matrix based on some or all of the plurality of the first channel estimation values, and obtaining a second equivalent channel matrix based on some or all of the plurality of the second channel estimation values;

obtaining a plurality of first equivalent channel coefficients based on some or all of the first channel estimation values and the first equivalent channel matrix, and obtain a plurality second equivalent channel coefficients based on some or all of the second channel estimation values and the second equivalent channel matrix;

obtaining a first precoding weight and a second precoding weight based on the plurality of the first equivalent channel coefficients and the plurality of the second equivalent channel coefficients;

precoding a signal based on the first precoding weight and the second precoding weight; and outputting the signal.

12. The non-transitory computer readable medium according to claim 11, wherein obtaining a first equalization coefficient based on some or all of the plurality of first channel estimation values and the first equivalent channel matrix, and obtaining a second equalization coefficient based on some or all of the plurality of second channel estimation values and the second equivalent channel matrix includes:

obtaining a first initial precoding weight and a second initial precoding weight based on the first equivalent channel matrix and the second equivalent channel matrix; and obtaining the first equalization coefficient based on some or all of the plurality of the first channel estimation values and the first initial precoding weight, and obtaining the second equalization coefficient based on some or all of the plurality of the second channel estimation values and the second initial precoding weight.

13. The non-transitory computer readable medium according to claim 12, wherein the obtaining the first equivalent channel matrix based on some or all of the plurality of the first channel estimation values, and the obtaining the second equivalent channel matrix based on some or all of the plurality of second channel estimation values includes:

obtaining a third equivalent channel matrix based on some or all of the plurality of the first channel estimation values, and obtaining a fourth equivalent channel matrix based on some or all of the plurality of the second channel estimation values, wherein the third equivalent channel matrix is a matrix of $l_1 \times n_1$, $l_1$ represents a quantity of transmit antennas of first data, the fourth equivalent channel matrix is a matrix of $l_2 \times n_2$, $l_2$ represents a quantity of transmit antennas of second data, $n_1$ represents a quantity of receive antennas corresponding to the first data, and $n_2$ represents a quantity of receive antennas corresponding to the second data; and obtaining the first equivalent channel matrix based on the third equivalent channel matrix and a first matrix $G_1$, and obtaining the second equivalent channel matrix based on the fourth equivalent channel matrix and a second matrix $G_2$, wherein the first matrix $G_1$ satisfies $$G_1 = \left[ \frac{I_1}{0_1} \right],$$

$I_1$ represents an identity matrix of $m_1 \times m_1$, $m_1$ represents a quantity of layers corresponding to the first data, and $0_1$ represents an all-0 matrix of $(n_1 - m_1) \times m_1$; and the second matrix $G_2$ satisfies $$G_2 = \left[ \frac{I_2}{0_2} \right],$$

$I_2$ represents an identity matrix of $m_2 \times m_2$, $m_2$ represents a quantity of layers corresponding to the second data, and $a_2$ represents an all-0 matrix of $(n_2 - m_2) \times m_2$.

14. The non-transitory computer readable medium according to claim 13, comprising:

obtaining a third matrix based on the first initial precoding weight and the third equivalent channel matrix, and obtaining a fourth matrix based on the second initial precoding weight and the fourth equivalent channel matrix;

obtaining a fifth equivalent channel matrix based on the third matrix and the third equivalent channel matrix, and obtaining a sixth equivalent channel matrix based on the fourth matrix and the fourth equivalent channel matrix; and obtaining a fifth matrix and a sixth matrix based on the fifth equivalent channel matrix and the sixth equivalent channel matrix;

updating the first initial precoding weight to the fifth matrix, and updating the second initial precoding weight to the sixth matrix.

15. The non-transitory computer readable medium according to claim 11, comprising:

obtaining first equivalent noise based on the first equalization coefficient, and obtaining second equivalent noise based on the second equalization coefficient; and wherein the obtaining the first precoding weight and the second precoding weight based on the plurality of the first equivalent channel coefficients and the plurality of the second equivalent channel coefficients includes:

obtaining the first precoding weight and the second precoding weight based on the plurality of the first equivalent channel coefficients, the plurality of the second equivalent channel coefficients, the first equivalent noise, and the second equivalent noise.

* * * * *